United States Patent
Kulshreshtha et al.

(10) Patent No.: US 10,873,794 B2
(45) Date of Patent: Dec. 22, 2020

(54) FLOWLET RESOLUTION FOR APPLICATION PERFORMANCE MONITORING AND MANAGEMENT

(71) Applicant: CISCO TECHNOLOGY, INC., San Jose, CA (US)

(72) Inventors: Ashutosh Kulshreshtha, San Jose, CA (US); Omid Madani, San Carlos, CA (US); Vimal Jeyakumar, Sunnyvale, CA (US); Navindra Yadav, Cupertino, CA (US); Ali Parandehgheibi, Sunnyvale, CA (US); Andy Sloane, Pleasanton, CA (US); Kai Chang, San Francisco, CA (US); Khawar Deen, Sunnyvale, CA (US); Shih-Chun Chang, San Jose, CA (US); Hai Vu, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 254 days.

(21) Appl. No.: 15/471,183

(22) Filed: Mar. 28, 2017

(65) Prior Publication Data
US 2018/0287907 A1    Oct. 4, 2018

(51) Int. Cl.
*G06F 15/173* (2006.01)
*H04Q 9/02* (2006.01)
(Continued)

(52) U.S. Cl.
CPC ........... *H04Q 9/02* (2013.01); *G06F 11/3495* (2013.01); *H04L 41/064* (2013.01);
(Continued)

(58) Field of Classification Search
CPC ...... G06F 11/3495; H04L 41/14; H04L 43/04; H04L 43/026; H04L 43/16;
(Continued)

(56) References Cited

U.S. PATENT DOCUMENTS 5,086,385 A    2/1992   Launey et al.
5,319,754 A    6/1994   Meinecke et al.
(Continued)

FOREIGN PATENT DOCUMENTS

CN    101093452    12/2007
CN    101770551    7/2010
(Continued)

OTHER PUBLICATIONS

Al-Fuqaha, Ala, et al., "Internet of Things: A Survey on Enabling Technologies, Protocols, and Applications," IEEE Communication Surveys & Tutorials. vol. 17, No. 4, Nov. 18, 2015, pp. 2347-2376.
(Continued)

*Primary Examiner* — Liang Che A Wang
*Assistant Examiner* — Johnny B Aguiar
(74) *Attorney, Agent, or Firm* — Polsinelli PC

(57) ABSTRACT

An application and network analytics platform can capture telemetry from servers and network devices operating within a network. The application and network analytics platform can determine an application dependency map (ADM) for an application executing in the network. Using the ADM, the application and network analytics platform can resolve flows into flowlets of various granularities, and determine baseline metrics for the flowlets. The baseline metrics can include transmission times, processing times, and/or data sizes for the flowlets. The application and network analytics platform can compare new flowlets against the baselines to assess availability, load, latency, and other performance metrics for the application. In some implementations, the application and network analytics platform can automate remediation of unavailability, load, latency, and other application performance issues.

15 Claims, 7 Drawing Sheets

(51) Int. Cl.
  *H04L 12/26* (2006.01)
  *G06F 11/34* (2006.01)
  *H04L 29/06* (2006.01)
  *H04L 12/24* (2006.01)
  *H04L 29/08* (2006.01)
(52) U.S. Cl.
  CPC ........ *H04L 41/0681* (2013.01); *H04L 43/026* (2013.01); *H04L 43/04* (2013.01); *H04L 63/1425* (2013.01); *H04L 41/14* (2013.01); *H04L 43/16* (2013.01); *H04L 67/125* (2013.01); *H04Q 2209/20* (2013.01)
(58) Field of Classification Search
  CPC ............... H04L 63/1425; H04L 41/064; H04L 41/0681; H04L 67/125; H04Q 9/02; H04Q 2209/20
  USPC .................................. 709/217, 219, 223, 224
  See application file for complete search history.

(56) References Cited

U.S. PATENT DOCUMENTS

| | | | |
|---|---|---|---|
| 5,400,246 | A | 3/1995 | Wilson et al. |
| 5,436,909 | A | 7/1995 | Dev et al. |
| 5,555,416 | A | 9/1996 | Owens et al. |
| 5,726,644 | A | 3/1998 | Jednacz et al. |
| 5,742,829 | A | 4/1998 | Davis et al. |
| 5,822,731 | A | 10/1998 | Schultz |
| 5,831,848 | A | 11/1998 | Rielly et al. |
| 5,903,545 | A | 5/1999 | Sabourin et al. |
| 6,012,096 | A | 1/2000 | Link et al. |
| 6,141,595 | A | 10/2000 | Gloudeman et al. |
| 6,144,962 | A | 11/2000 | Weinberg et al. |
| 6,239,699 | B1 | 5/2001 | Ronnen |
| 6,247,058 | B1 | 6/2001 | Miller et al. |
| 6,249,241 | B1 | 6/2001 | Jordan et al. |
| 6,330,562 | B1 | 12/2001 | Boden et al. |
| 6,353,775 | B1 | 3/2002 | Nichols |
| 6,525,658 | B2 | 2/2003 | Streetman et al. |
| 6,546,420 | B1 | 4/2003 | Lemler et al. |
| 6,597,663 | B1 | 7/2003 | Rekhter |
| 6,611,896 | B1 | 8/2003 | Mason, Jr. et al. |
| 6,654,750 | B1 | 11/2003 | Adams et al. |
| 6,728,779 | B1 | 4/2004 | Griffin et al. |
| 6,801,878 | B1 | 10/2004 | Hintz et al. |
| 6,816,461 | B1 | 11/2004 | Scrandis et al. |
| 6,847,993 | B1 | 1/2005 | Novaes et al. |
| 6,848,106 | B1 | 1/2005 | Hipp |
| 6,925,490 | B1 | 8/2005 | Novaes et al. |
| 6,958,998 | B2 | 10/2005 | Shorey |
| 6,983,323 | B2 | 1/2006 | Cantrell et al. |
| 6,996,817 | B2 | 2/2006 | Birum et al. |
| 6,999,452 | B1 | 2/2006 | Drummond-Murray et al. |
| 7,002,464 | B2 | 2/2006 | Bruemmer et al. |
| 7,024,468 | B1 | 4/2006 | Meyer et al. |
| 7,096,368 | B2 | 8/2006 | Kouznetsov et al. |
| 7,111,055 | B2 | 9/2006 | Falkner |
| 7,120,934 | B2 | 10/2006 | Ishikawa |
| 7,133,923 | B2 | 11/2006 | MeLampy et al. |
| 7,162,643 | B1 | 1/2007 | Sankaran et al. |
| 7,181,769 | B1 | 2/2007 | Keanini et al. |
| 7,185,103 | B1 | 2/2007 | Jain |
| 7,203,740 | B1 | 4/2007 | Putzolu et al. |
| 7,302,487 | B2 | 11/2007 | Ylonen et al. |
| 7,337,206 | B1 | 2/2008 | Wen et al. |
| 7,349,761 | B1 | 3/2008 | Cruse |
| 7,353,511 | B1 | 4/2008 | Ziese |
| 7,356,679 | B1 | 4/2008 | Le et al. |
| 7,360,072 | B1 | 4/2008 | Soltis et al. |
| 7,370,092 | B2 | 5/2008 | Aderton et al. |
| 7,395,195 | B2 | 7/2008 | Suenbuel et al. |
| 7,444,404 | B2 | 10/2008 | Wetherall et al. |
| 7,466,681 | B2 | 12/2008 | Ashwood-Smith et al. |
| 7,467,205 | B1 | 12/2008 | Dempster et al. |
| 7,496,040 | B2 | 2/2009 | Seo |
| 7,496,575 | B2 | 2/2009 | Buccella et al. |
| 7,530,105 | B2 | 5/2009 | Gilbert et al. |
| 7,539,770 | B2 | 5/2009 | Meier |
| 7,568,107 | B1 | 7/2009 | Rathi et al. |
| 7,610,330 | B1 | 10/2009 | Quinn et al. |
| 7,633,942 | B2 | 12/2009 | Bearden et al. |
| 7,644,438 | B1 | 1/2010 | Dash et al. |
| 7,676,570 | B2 | 3/2010 | Levy et al. |
| 7,681,131 | B1 | 3/2010 | Quarterman et al. |
| 7,693,947 | B2 | 4/2010 | Judge et al. |
| 7,743,242 | B2 | 6/2010 | Oberhaus et al. |
| 7,752,307 | B2 | 7/2010 | Takara |
| 7,774,498 | B1 | 8/2010 | Kraemer et al. |
| 7,783,457 | B2 | 8/2010 | Cunningham |
| 7,787,480 | B1 | 8/2010 | Mehta et al. |
| 7,788,477 | B1 | 8/2010 | Huang et al. |
| 7,808,897 | B1 | 10/2010 | Mehta et al. |
| 7,813,822 | B1 | 10/2010 | Hoffberg |
| 7,844,696 | B2 | 11/2010 | Labovitz et al. |
| 7,844,744 | B2 | 11/2010 | Abercrombie et al. |
| 7,864,707 | B2 | 1/2011 | Dimitropoulos et al. |
| 7,873,025 | B2 | 1/2011 | Patel et al. |
| 7,873,074 | B1 | 1/2011 | Boland |
| 7,874,001 | B2 | 1/2011 | Beck et al. |
| 7,885,197 | B2 | 2/2011 | Metzler |
| 7,895,649 | B1 | 2/2011 | Brook et al. |
| 7,904,420 | B2 | 3/2011 | Ianni |
| 7,930,752 | B2 | 4/2011 | Hertzog et al. |
| 7,934,248 | B1 | 4/2011 | Yehuda et al. |
| 7,957,934 | B2 | 6/2011 | Greifeneder |
| 7,961,637 | B2 | 6/2011 | McBeath |
| 7,970,946 | B1 | 6/2011 | Djabarov et al. |
| 7,975,035 | B2 | 7/2011 | Popescu et al. |
| 8,001,610 | B1 | 8/2011 | Chickering et al. |
| 8,005,935 | B2 | 8/2011 | Pradhan et al. |
| 8,040,232 | B2 | 10/2011 | Oh et al. |
| 8,040,822 | B2 | 10/2011 | Proulx et al. |
| 8,056,134 | B1 | 11/2011 | Ogilvie |
| 8,115,617 | B2 | 2/2012 | Thubert et al. |
| 8,135,657 | B2 | 3/2012 | Kapoor et al. |
| 8,156,430 | B2 | 4/2012 | Newman |
| 8,160,063 | B2 | 4/2012 | Maltz et al. |
| 8,179,809 | B1 | 5/2012 | Eppstein et al. |
| 8,181,248 | B2 | 5/2012 | Oh et al. |
| 8,185,824 | B1 | 5/2012 | Mitchell et al. |
| 8,239,365 | B2 | 8/2012 | Salman |
| 8,239,915 | B1 | 8/2012 | Satish et al. |
| 8,250,657 | B1 | 8/2012 | Nachenberg et al. |
| 8,255,972 | B2 | 8/2012 | Azagury et al. |
| 8,266,697 | B2 | 9/2012 | Coffman |
| 8,272,875 | B1 | 9/2012 | Jurmain |
| 8,281,397 | B2 | 10/2012 | Vaidyanathan et al. |
| 8,291,495 | B1 | 10/2012 | Burns et al. |
| 8,296,847 | B2 | 10/2012 | Mendonca et al. |
| 8,311,973 | B1 | 11/2012 | Zadeh |
| 8,365,286 | B2 | 1/2013 | Poston |
| 8,370,407 | B1 | 2/2013 | Devarajan et al. |
| 8,381,289 | B1 | 2/2013 | Pereira et al. |
| 8,391,270 | B2 | 3/2013 | Van Der Stok et al. |
| 8,407,164 | B2 | 3/2013 | Malik et al. |
| 8,407,798 | B1 | 3/2013 | Lotem et al. |
| 8,413,235 | B1 | 4/2013 | Chen et al. |
| 8,442,073 | B2 | 5/2013 | Skubacz et al. |
| 8,451,731 | B1 | 5/2013 | Lee et al. |
| 8,462,212 | B1 | 6/2013 | Kundu et al. |
| 8,489,765 | B2 | 7/2013 | Vasseur et al. |
| 8,499,348 | B1 | 7/2013 | Rubin |
| 8,516,590 | B1 | 8/2013 | Ranadive et al. |
| 8,527,977 | B1 | 9/2013 | Cheng et al. |
| 8,549,635 | B2 | 10/2013 | Muttik et al. |
| 8,570,861 | B1 | 10/2013 | Brandwine et al. |
| 8,572,600 | B2 | 10/2013 | Chung et al. |
| 8,572,734 | B2 | 10/2013 | McConnell et al. |
| 8,572,735 | B2 | 10/2013 | Ghosh et al. |
| 8,572,739 | B1 | 10/2013 | Cruz et al. |
| 8,588,081 | B2 | 11/2013 | Salam et al. |
| 8,600,726 | B1 | 12/2013 | Varshney et al. |
| 8,613,084 | B2 | 12/2013 | Dalcher |

(56) References Cited

U.S. PATENT DOCUMENTS

| | | | |
|---|---|---|---|
| 8,615,803 B2 | 12/2013 | Dacier et al. | |
| 8,630,316 B2 | 1/2014 | Haba | |
| 8,631,464 B2 | 1/2014 | Belakhdar et al. | |
| 8,640,086 B2 | 1/2014 | Bonev et al. | |
| 8,656,493 B2 | 2/2014 | Capalik | |
| 8,661,544 B2 | 2/2014 | Yen et al. | |
| 8,677,487 B2 | 3/2014 | Balupari et al. | |
| 8,683,389 B1 | 3/2014 | Bar-Yam et al. | |
| 8,706,914 B2 | 4/2014 | Duchesneau | |
| 8,713,676 B2 | 4/2014 | Pandrangi et al. | |
| 8,719,452 B1 | 5/2014 | Ding et al. | |
| 8,719,835 B2 | 5/2014 | Kanso et al. | |
| 8,750,287 B2 | 6/2014 | Bui et al. | |
| 8,752,042 B2 | 6/2014 | Ratica | |
| 8,752,179 B2 | 6/2014 | Zaitsev | |
| 8,755,396 B2 | 6/2014 | Sindhu et al. | |
| 8,762,951 B1 | 6/2014 | Kosche et al. | |
| 8,769,084 B2 | 7/2014 | Westerfeld et al. | |
| 8,775,577 B1 | 7/2014 | Alford et al. | |
| 8,776,180 B2 | 7/2014 | Kumar et al. | |
| 8,812,448 B1 | 8/2014 | Anderson et al. | |
| 8,812,725 B2 | 8/2014 | Kulkarni | |
| 8,813,236 B1 | 8/2014 | Saha et al. | |
| 8,825,848 B1 | 9/2014 | Dotan et al. | |
| 8,832,013 B1 | 9/2014 | Adams et al. | |
| 8,832,461 B2 | 9/2014 | Saroiu et al. | |
| 8,849,926 B2 | 9/2014 | Marzencki et al. | |
| 8,881,258 B2 | 11/2014 | Paul et al. | |
| 8,887,238 B2 | 11/2014 | Howard et al. | |
| 8,904,520 B1 | 12/2014 | Nachenberg et al. | |
| 8,908,685 B2 | 12/2014 | Patel et al. | |
| 8,914,497 B1 | 12/2014 | Xiao et al. | |
| 8,931,043 B2 | 1/2015 | Cooper et al. | |
| 8,954,610 B2 | 2/2015 | Berke et al. | |
| 8,955,124 B2 | 2/2015 | Kim et al. | |
| 8,966,021 B1 | 2/2015 | Allen | |
| 8,966,625 B1 | 2/2015 | Zuk et al. | |
| 8,973,147 B2 | 3/2015 | Pearcy et al. | |
| 8,984,331 B2 | 3/2015 | Quinn | |
| 8,990,386 B2 | 3/2015 | He et al. | |
| 8,996,695 B2 | 3/2015 | Anderson et al. | |
| 8,997,227 B1 | 3/2015 | Mhatre et al. | |
| 9,014,047 B2 | 4/2015 | Alcala et al. | |
| 9,015,716 B2 | 4/2015 | Fletcher et al. | |
| 9,071,575 B2 | 6/2015 | Lemaster et al. | |
| 9,088,598 B1 | 7/2015 | Zhang et al. | |
| 9,110,905 B2 | 8/2015 | Polley et al. | |
| 9,117,075 B1 | 8/2015 | Yeh | |
| 9,130,836 B2 | 9/2015 | Kapadia et al. | |
| 9,152,789 B2 | 10/2015 | Natarajan et al. | |
| 9,160,764 B2 | 10/2015 | Stiansen et al. | |
| 9,170,917 B2 | 10/2015 | Kumar et al. | |
| 9,178,906 B1 | 11/2015 | Chen et al. | |
| 9,185,127 B2 | 11/2015 | Neou et al. | |
| 9,191,400 B1 | 11/2015 | Ptasinski et al. | |
| 9,191,402 B2 | 11/2015 | Yan | |
| 9,197,654 B2 | 11/2015 | Ben-Shalom et al. | |
| 9,225,793 B2 | 12/2015 | Dutta et al. | |
| 9,237,111 B2 | 1/2016 | Banavalikar et al. | |
| 9,246,702 B1 | 1/2016 | Sharma et al. | |
| 9,246,773 B2 | 1/2016 | Degioanni | |
| 9,253,042 B2 | 2/2016 | Lumezanu et al. | |
| 9,253,206 B1 | 2/2016 | Fleischman | |
| 9,258,203 B1* | 2/2016 | Goodwin | H04L 41/5035 |
| 9,258,217 B2 | 2/2016 | Duffield et al. | |
| 9,281,940 B2 | 3/2016 | Matsuda et al. | |
| 9,286,047 B1 | 3/2016 | Avramov et al. | |
| 9,294,486 B1 | 3/2016 | Chiang et al. | |
| 9,317,574 B1 | 4/2016 | Brisebois et al. | |
| 9,319,384 B2 | 4/2016 | Yan et al. | |
| 9,369,435 B2 | 6/2016 | Short et al. | |
| 9,369,479 B2 | 6/2016 | Lin | |
| 9,378,068 B2 | 6/2016 | Anantharam et al. | |
| 9,396,327 B2 | 6/2016 | Shimomura et al. | |
| 9,405,903 B1 | 8/2016 | Xie et al. | |
| 9,417,985 B2 | 8/2016 | Baars et al. | |
| 9,418,222 B1 | 8/2016 | Rivera et al. | |
| 9,426,068 B2 | 8/2016 | Dunbar et al. | |
| 9,454,324 B1 | 9/2016 | Madhavapeddi | |
| 9,462,013 B1 | 10/2016 | Boss et al. | |
| 9,465,696 B2 | 10/2016 | McNeil et al. | |
| 9,501,744 B1 | 11/2016 | Brisebois et al. | |
| 9,531,589 B2 | 12/2016 | Clemm et al. | |
| 9,563,517 B1 | 2/2017 | Natanzon et al. | |
| 9,621,413 B1 | 4/2017 | Lee | |
| 9,634,915 B2 | 4/2017 | Bley | |
| 9,645,892 B1 | 5/2017 | Patwardhan | |
| 9,684,453 B2 | 6/2017 | Holt et al. | |
| 9,697,033 B2 | 7/2017 | Koponen et al. | |
| 9,733,973 B2 | 8/2017 | Prasad et al. | |
| 9,749,145 B2 | 8/2017 | Banavalikar et al. | |
| 9,800,608 B2 | 10/2017 | Korsunsky et al. | |
| 9,904,584 B2 | 2/2018 | Konig et al. | |
| 9,916,538 B2 | 3/2018 | Zadeh et al. | |
| 9,935,851 B2 | 4/2018 | Gandham et al. | |
| 10,009,240 B2 | 6/2018 | Rao et al. | |
| 2001/0028646 A1 | 10/2001 | Arts et al. | |
| 2002/0053033 A1 | 5/2002 | Cooper et al. | |
| 2002/0097687 A1 | 7/2002 | Meiri et al. | |
| 2002/0103793 A1 | 8/2002 | Koller et al. | |
| 2002/0107857 A1 | 8/2002 | Teraslinna | |
| 2002/0141343 A1 | 10/2002 | Bays | |
| 2002/0184393 A1 | 12/2002 | Leddy et al. | |
| 2003/0023601 A1 | 1/2003 | Fortier, Jr. et al. | |
| 2003/0065986 A1 | 4/2003 | Fraenkel et al. | |
| 2003/0097439 A1 | 5/2003 | Strayer et al. | |
| 2003/0126242 A1 | 7/2003 | Chang | |
| 2003/0145232 A1 | 7/2003 | Poletto et al. | |
| 2003/0151513 A1 | 8/2003 | Herrmann et al. | |
| 2003/0154399 A1 | 8/2003 | Zuk et al. | |
| 2003/0177208 A1 | 9/2003 | Harvey, IV | |
| 2004/0019676 A1 | 1/2004 | Iwatsuki et al. | |
| 2004/0030776 A1 | 2/2004 | Cantrell et al. | |
| 2004/0039728 A1* | 2/2004 | Fenlon | H04L 41/0681 |
| 2004/0213221 A1 | 10/2004 | Civanlar et al. | |
| 2004/0220984 A1 | 11/2004 | Dudfield et al. | |
| 2004/0243533 A1 | 12/2004 | Dempster et al. | |
| 2004/0255050 A1 | 12/2004 | Takehiro et al. | |
| 2004/0268149 A1 | 12/2004 | Aaron | |
| 2005/0028154 A1 | 2/2005 | Smith et al. | |
| 2005/0039104 A1 | 2/2005 | Shah et al. | |
| 2005/0063377 A1 | 3/2005 | Bryant et al. | |
| 2005/0083933 A1 | 4/2005 | Fine et al. | |
| 2005/0108331 A1 | 5/2005 | Osterman | |
| 2005/0122325 A1 | 6/2005 | Twait | |
| 2005/0138157 A1 | 6/2005 | Jung et al. | |
| 2005/0166066 A1 | 7/2005 | Ahuja et al. | |
| 2005/0177829 A1 | 8/2005 | Vishwanath | |
| 2005/0182681 A1 | 8/2005 | Bruskotter et al. | |
| 2005/0185621 A1 | 8/2005 | Sivakumar et al. | |
| 2005/0198247 A1 | 9/2005 | Perry et al. | |
| 2005/0198371 A1 | 9/2005 | Smith et al. | |
| 2005/0198629 A1 | 9/2005 | Vishwanath | |
| 2005/0207376 A1 | 9/2005 | Ashwood-Smith et al. | |
| 2005/0240799 A1* | 10/2005 | Manfredi | H04L 41/147 714/4.1 |
| 2005/0257244 A1 | 11/2005 | Joly et al. | |
| 2005/0289244 A1 | 12/2005 | Sahu et al. | |
| 2006/0048218 A1 | 3/2006 | Lingafelt et al. | |
| 2006/0077909 A1 | 4/2006 | Saleh et al. | |
| 2006/0080733 A1 | 4/2006 | Khosmood et al. | |
| 2006/0089985 A1 | 4/2006 | Poletto | |
| 2006/0095968 A1 | 5/2006 | Portolani et al. | |
| 2006/0143432 A1 | 6/2006 | Rothman et al. | |
| 2006/0156408 A1 | 7/2006 | Himberger et al. | |
| 2006/0159032 A1 | 7/2006 | Ukrainetz et al. | |
| 2006/0173912 A1 | 8/2006 | Lindvall et al. | |
| 2006/0195448 A1 | 8/2006 | Newport | |
| 2006/0272018 A1 | 11/2006 | Fouant | |
| 2006/0274659 A1 | 12/2006 | Ouderkirk | |
| 2006/0280179 A1 | 12/2006 | Meier | |
| 2006/0294219 A1 | 12/2006 | Ogawa et al. | |
| 2007/0014275 A1 | 1/2007 | Bettink et al. | |
| 2007/0025306 A1 | 2/2007 | Cox et al. | |

(56) References Cited

U.S. PATENT DOCUMENTS

| | | |
|---|---|---|
| 2007/0044147 A1 | 2/2007 | Choi et al. |
| 2007/0097976 A1 | 5/2007 | Wood et al. |
| 2007/0118654 A1 | 5/2007 | Jamkhedkar et al. |
| 2007/0127491 A1 | 6/2007 | Verzijp et al. |
| 2007/0162420 A1 | 7/2007 | Ou et al. |
| 2007/0169179 A1 | 7/2007 | Narad |
| 2007/0195729 A1 | 8/2007 | Li et al. |
| 2007/0195794 A1 | 8/2007 | Fujita et al. |
| 2007/0195797 A1 | 8/2007 | Patel et al. |
| 2007/0201474 A1 | 8/2007 | Isobe |
| 2007/0211637 A1 | 9/2007 | Mitchell |
| 2007/0214348 A1 | 9/2007 | Danielsen |
| 2007/0230415 A1 | 10/2007 | Malik |
| 2007/0232265 A1 | 10/2007 | Park et al. |
| 2007/0250930 A1 | 10/2007 | Aziz et al. |
| 2007/0300061 A1 | 12/2007 | Kim et al. |
| 2008/0002697 A1 | 1/2008 | Anantharamaiah et al. |
| 2008/0022385 A1 | 1/2008 | Crowell et al. |
| 2008/0028389 A1 | 1/2008 | Genty et al. |
| 2008/0046708 A1 | 2/2008 | Fitzgerald et al. |
| 2008/0049633 A1 | 2/2008 | Edwards et al. |
| 2008/0056124 A1 | 3/2008 | Nanda et al. |
| 2008/0082662 A1 | 4/2008 | Danliker et al. |
| 2008/0101234 A1 | 5/2008 | Nakil et al. |
| 2008/0120350 A1 | 5/2008 | Grabowski et al. |
| 2008/0126534 A1 | 5/2008 | Mueller et al. |
| 2008/0141246 A1 | 6/2008 | Kuck et al. |
| 2008/0155245 A1 | 6/2008 | Lipscombe et al. |
| 2008/0250122 A1 | 10/2008 | Zsigmond et al. |
| 2008/0270199 A1 | 10/2008 | Chess et al. |
| 2008/0282347 A1 | 11/2008 | Dadhia et al. |
| 2008/0295163 A1 | 11/2008 | Kang |
| 2008/0301765 A1 | 12/2008 | Nicol et al. |
| 2009/0059934 A1 | 3/2009 | Aggarwal et al. |
| 2009/0064332 A1 | 3/2009 | Porras et al. |
| 2009/0109849 A1 | 4/2009 | Wood et al. |
| 2009/0133126 A1 | 5/2009 | Jang et al. |
| 2009/0138590 A1 | 5/2009 | Lee et al. |
| 2009/0180393 A1 | 7/2009 | Nakamura |
| 2009/0241170 A1 | 9/2009 | Kumar et al. |
| 2009/0292795 A1 | 11/2009 | Ford et al. |
| 2009/0296593 A1 | 12/2009 | Prescott |
| 2009/0300180 A1 | 12/2009 | Dehaan et al. |
| 2009/0307753 A1 | 12/2009 | Dupont et al. |
| 2009/0313373 A1 | 12/2009 | Hanna et al. |
| 2009/0313698 A1 | 12/2009 | Wahl |
| 2009/0319912 A1 | 12/2009 | Serr et al. |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0049839 A1 | 2/2010 | Parker et al. |
| 2010/0054241 A1 | 3/2010 | Shah et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0095377 A1 | 4/2010 | Krywaniuk |
| 2010/0138526 A1 | 6/2010 | DeHaan et al. |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0180016 A1 | 7/2010 | Bugwadia et al. |
| 2010/0194741 A1 | 8/2010 | Finocchio |
| 2010/0220584 A1 | 9/2010 | DeHaan et al. |
| 2010/0235514 A1 | 9/2010 | Beachem |
| 2010/0235879 A1 | 9/2010 | Burnside et al. |
| 2010/0235915 A1 | 9/2010 | Memon et al. |
| 2010/0287266 A1 | 11/2010 | Asati et al. |
| 2010/0303240 A1 | 12/2010 | Beachem |
| 2010/0306180 A1 | 12/2010 | Johnson et al. |
| 2010/0317420 A1 | 12/2010 | Hoffberg |
| 2010/0319060 A1 | 12/2010 | Aiken et al. |
| 2011/0004935 A1 | 1/2011 | Moffie et al. |
| 2011/0010585 A1 | 1/2011 | Bugenhagen et al. |
| 2011/0022641 A1 | 1/2011 | Werth et al. |
| 2011/0055381 A1 | 3/2011 | Narasimhan et al. |
| 2011/0055388 A1 | 3/2011 | Yumerefendi et al. |
| 2011/0066719 A1 | 3/2011 | Miryanov et al. |
| 2011/0069685 A1 | 3/2011 | Tofighbakhsh |
| 2011/0072119 A1 | 3/2011 | Bronstein et al. |
| 2011/0083125 A1 | 4/2011 | Komatsu et al. |
| 2011/0085556 A1 | 4/2011 | Breslin et al. |
| 2011/0103259 A1 | 5/2011 | Aybay et al. |
| 2011/0107074 A1 | 5/2011 | Chan et al. |
| 2011/0107331 A1 | 5/2011 | Evans et al. |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0153039 A1 | 6/2011 | Gvelesiani et al. |
| 2011/0153811 A1 | 6/2011 | Jeong et al. |
| 2011/0158088 A1 | 6/2011 | Lofstrand et al. |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0196957 A1 | 8/2011 | Ayachitula et al. |
| 2011/0202655 A1 | 8/2011 | Sharma et al. |
| 2011/0214174 A1 | 9/2011 | Herzog et al. |
| 2011/0225207 A1 | 9/2011 | Subramanian et al. |
| 2011/0228696 A1 | 9/2011 | Agarwal et al. |
| 2011/0238793 A1 | 9/2011 | Bedare et al. |
| 2011/0246663 A1 | 10/2011 | Melsen et al. |
| 2011/0277034 A1 | 11/2011 | Hanson |
| 2011/0283277 A1 | 11/2011 | Castillo et al. |
| 2011/0302652 A1 | 12/2011 | Westerfeld |
| 2011/0314148 A1 | 12/2011 | Petersen et al. |
| 2011/0317982 A1 | 12/2011 | Xu et al. |
| 2012/0005542 A1 | 1/2012 | Petersen et al. |
| 2012/0079592 A1 | 3/2012 | Pandrangi |
| 2012/0089664 A1 | 4/2012 | Igelka |
| 2012/0102361 A1 | 4/2012 | Sass et al. |
| 2012/0102543 A1 | 4/2012 | Kohli et al. |
| 2012/0110188 A1 | 5/2012 | Van Biljon et al. |
| 2012/0117226 A1 | 5/2012 | Tanaka et al. |
| 2012/0117642 A1 | 5/2012 | Lin et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0195198 A1 | 8/2012 | Regan |
| 2012/0197856 A1 | 8/2012 | Banka et al. |
| 2012/0198541 A1 | 8/2012 | Reeves |
| 2012/0210318 A1 | 8/2012 | Sanghvi et al. |
| 2012/0216271 A1 | 8/2012 | Cooper et al. |
| 2012/0218989 A1 | 8/2012 | Tanabe et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240232 A1 | 9/2012 | Azuma |
| 2012/0246303 A1 | 9/2012 | Petersen et al. |
| 2012/0254109 A1 | 10/2012 | Shukla et al. |
| 2012/0260227 A1 | 10/2012 | Shukla et al. |
| 2012/0278021 A1 | 11/2012 | Lin et al. |
| 2012/0281700 A1 | 11/2012 | Koganti et al. |
| 2012/0300628 A1 | 11/2012 | Prescott et al. |
| 2013/0003538 A1 | 1/2013 | Greenberg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0038358 A1 | 2/2013 | Cook et al. |
| 2013/0041934 A1 | 2/2013 | Annamalaisami et al. |
| 2013/0054682 A1 | 2/2013 | Malik et al. |
| 2013/0085889 A1 | 4/2013 | Fitting et al. |
| 2013/0086272 A1 | 4/2013 | Chen et al. |
| 2013/0103827 A1 | 4/2013 | Dunlap et al. |
| 2013/0107709 A1 | 5/2013 | Campbell et al. |
| 2013/0124807 A1 | 5/2013 | Nielsen et al. |
| 2013/0125107 A1 | 5/2013 | Bandakka et al. |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0173784 A1 | 7/2013 | Wang et al. |
| 2013/0174256 A1 | 7/2013 | Powers |
| 2013/0179487 A1 | 7/2013 | Lubetzky et al. |
| 2013/0179879 A1 | 7/2013 | Zhang et al. |

(56) References Cited

U.S. PATENT DOCUMENTS

| | | |
|---|---|---|
| 2013/0198517 A1 | 8/2013 | Mazzarella |
| 2013/0198839 A1 | 8/2013 | Wei et al. |
| 2013/0201986 A1 | 8/2013 | Sajassi et al. |
| 2013/0205293 A1 | 8/2013 | Levijarvi et al. |
| 2013/0219161 A1 | 8/2013 | Fontignie et al. |
| 2013/0219500 A1 | 8/2013 | Lukas et al. |
| 2013/0232498 A1 | 9/2013 | Mangtani et al. |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0318357 A1 | 11/2013 | Abraham et al. |
| 2013/0326623 A1 | 12/2013 | Kruglick |
| 2013/0333029 A1 | 12/2013 | Chesla et al. |
| 2013/0336164 A1 | 12/2013 | Yang et al. |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0010069 A1* | 1/2014 | Abbasi ............... H04W 40/248 370/221 |
| 2014/0012814 A1 | 1/2014 | Bercovici et al. |
| 2014/0019972 A1 | 1/2014 | Yahalom et al. |
| 2014/0031005 A1 | 1/2014 | Sumcad et al. |
| 2014/0033193 A1 | 1/2014 | Palaniappan |
| 2014/0036688 A1 | 2/2014 | Stassinopoulos et al. |
| 2014/0040343 A1 | 2/2014 | Nickolov et al. |
| 2014/0047185 A1 | 2/2014 | Peterson et al. |
| 2014/0047372 A1 | 2/2014 | Gnezdov et al. |
| 2014/0056318 A1 | 2/2014 | Hansson et al. |
| 2014/0059200 A1 | 2/2014 | Nguyen et al. |
| 2014/0074946 A1 | 3/2014 | Dirstine et al. |
| 2014/0089494 A1 | 3/2014 | Dasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |
| 2014/0115219 A1 | 4/2014 | Ajanovic et al. |
| 2014/0129942 A1 | 5/2014 | Rathod |
| 2014/0137109 A1 | 5/2014 | Sharma et al. |
| 2014/0140244 A1 | 5/2014 | Kapadia et al. |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0156861 A1 | 6/2014 | Cruz-Aguilar et al. |
| 2014/0164607 A1 | 6/2014 | Bai et al. |
| 2014/0165054 A1* | 6/2014 | Wang ............... G06F 9/45558 718/1 |
| 2014/0165200 A1 | 6/2014 | Singla |
| 2014/0165207 A1 | 6/2014 | Engel et al. |
| 2014/0173623 A1 | 6/2014 | Chang et al. |
| 2014/0192639 A1 | 7/2014 | Smirnov |
| 2014/0201717 A1 | 7/2014 | Mascaro et al. |
| 2014/0215573 A1 | 7/2014 | Cepuran |
| 2014/0215621 A1 | 7/2014 | Xaypanya et al. |
| 2014/0224784 A1 | 8/2014 | Kohler |
| 2014/0225603 A1 | 8/2014 | Auguste et al. |
| 2014/0233387 A1 | 8/2014 | Zheng et al. |
| 2014/0269777 A1 | 9/2014 | Rothstein et al. |
| 2014/0280499 A1 | 9/2014 | Basavaiah et al. |
| 2014/0281030 A1 | 9/2014 | Cui et al. |
| 2014/0286354 A1 | 9/2014 | Van De Poel et al. |
| 2014/0289854 A1 | 9/2014 | Mahvi |
| 2014/0298461 A1 | 10/2014 | Hohndel et al. |
| 2014/0307686 A1 | 10/2014 | Su et al. |
| 2014/0317278 A1 | 10/2014 | Kersch et al. |
| 2014/0317737 A1 | 10/2014 | Shin et al. |
| 2014/0330616 A1 | 11/2014 | Lyras |
| 2014/0331048 A1 | 11/2014 | Casas-Sanchez et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0348182 A1 | 11/2014 | Chandra et al. |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2015/0006689 A1 | 1/2015 | Szilagyi et al. |
| 2015/0006714 A1 | 1/2015 | Jain |
| 2015/0009840 A1 | 1/2015 | Pruthi et al. |
| 2015/0026809 A1 | 1/2015 | Altman et al. |
| 2015/0033305 A1 | 1/2015 | Shear et al. |
| 2015/0036480 A1 | 2/2015 | Huang et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0052441 A1 | 2/2015 | Degioanni |
| 2015/0058976 A1 | 2/2015 | Carney et al. |
| 2015/0067143 A1 | 3/2015 | Babakhan et al. |
| 2015/0067786 A1 | 3/2015 | Fiske |
| 2015/0082151 A1 | 3/2015 | Liang et al. |
| 2015/0082430 A1 | 3/2015 | Sridhara et al. |
| 2015/0085665 A1 | 3/2015 | Kompella et al. |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1 | 5/2015 | Agarwal et al. |
| 2015/0124652 A1 | 5/2015 | Dharmapurikar et al. |
| 2015/0128133 A1 | 5/2015 | Pohlmann |
| 2015/0128205 A1 | 5/2015 | Mahaffey et al. |
| 2015/0138993 A1 | 5/2015 | Forster et al. |
| 2015/0142962 A1 | 5/2015 | Srinivas et al. |
| 2015/0195291 A1 | 7/2015 | Zuk et al. |
| 2015/0222939 A1 | 8/2015 | Gallant et al. |
| 2015/0249622 A1 | 9/2015 | Phillips et al. |
| 2015/0256555 A1 | 9/2015 | Choi et al. |
| 2015/0261842 A1 | 9/2015 | Huang et al. |
| 2015/0261886 A1 | 9/2015 | Wu et al. |
| 2015/0271008 A1 | 9/2015 | Jain et al. |
| 2015/0271255 A1 | 9/2015 | Mackay et al. |
| 2015/0295945 A1 | 10/2015 | Canzanese, Jr. et al. |
| 2015/0312233 A1 | 10/2015 | Graham, III et al. |
| 2015/0347554 A1 | 12/2015 | Vasantham et al. |
| 2015/0356297 A1 | 12/2015 | Yang et al. |
| 2015/0358352 A1 | 12/2015 | Chasin et al. |
| 2016/0006753 A1 | 1/2016 | McDaid et al. |
| 2016/0019030 A1 | 1/2016 | Shukla et al. |
| 2016/0020959 A1 | 1/2016 | Rahaman |
| 2016/0021131 A1 | 1/2016 | Heilig |
| 2016/0026552 A1 | 1/2016 | Holden et al. |
| 2016/0036636 A1 | 2/2016 | Erickson et al. |
| 2016/0036837 A1 | 2/2016 | Jain et al. |
| 2016/0050132 A1 | 2/2016 | Zhang et al. |
| 2016/0072815 A1 | 3/2016 | Rieke et al. |
| 2016/0080414 A1 | 3/2016 | Kolton et al. |
| 2016/0087861 A1 | 3/2016 | Kuan et al. |
| 2016/0094394 A1 | 3/2016 | Sharma et al. |
| 2016/0094529 A1 | 3/2016 | Mityagin |
| 2016/0103692 A1 | 4/2016 | Guntaka et al. |
| 2016/0105350 A1 | 4/2016 | Greifeneder et al. |
| 2016/0112270 A1 | 4/2016 | Danait et al. |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0173535 A1 | 6/2016 | Barabash et al. |
| 2016/0183093 A1 | 6/2016 | Vaughn et al. |
| 2016/0191476 A1 | 6/2016 | Schutz et al. |
| 2016/0205002 A1 | 7/2016 | Rieke et al. |
| 2016/0216994 A1 | 7/2016 | Sefidcon et al. |
| 2016/0217022 A1 | 7/2016 | Velipasaoglu et al. |
| 2016/0255082 A1 | 9/2016 | Rathod |
| 2016/0269424 A1 | 9/2016 | Chandola et al. |
| 2016/0269442 A1 | 9/2016 | Shieh |
| 2016/0269482 A1* | 9/2016 | Jamjoom ............. H04L 67/1095 |

(56) References Cited

U.S. PATENT DOCUMENTS

| | | |
|---|---|---|
| 2016/0294691 A1 | 10/2016 | Joshi |
| 2016/0308908 A1 | 10/2016 | Kirby et al. |
| 2016/0337204 A1 | 11/2016 | Dubey et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1* | 12/2016 | Madani ............ H04L 63/1425 |
| 2016/0359679 A1 | 12/2016 | Parandehgheibi et al. |
| 2016/0359680 A1 | 12/2016 | Parandehgheibi et al. |
| 2016/0359686 A1 | 12/2016 | Parandehgheibi et al. |
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parandehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parandehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359905 A1 | 12/2016 | Touboul et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2016/0380865 A1 | 12/2016 | Dubal et al. |
| 2017/0006141 A1 | 1/2017 | Bhadra |
| 2017/0024453 A1 | 1/2017 | Raja et al. |
| 2017/0032310 A1 | 2/2017 | Mimnaugh |
| 2017/0034018 A1 | 2/2017 | Parandehgheibi et al. |
| 2017/0048121 A1 | 2/2017 | Hobbs et al. |
| 2017/0070582 A1 | 3/2017 | Desai et al. |
| 2017/0085483 A1 | 3/2017 | Mihaly et al. |
| 2017/0104658 A1* | 4/2017 | Sykes ............... H04L 41/044 |
| 2017/0126532 A1* | 5/2017 | Bansal ............... H04L 43/04 |
| 2017/0208487 A1 | 7/2017 | Ratakonda et al. |
| 2017/0250880 A1 | 8/2017 | Akens et al. |
| 2017/0250951 A1 | 8/2017 | Wang et al. |
| 2017/0289067 A1 | 10/2017 | Lu et al. |
| 2017/0295141 A1 | 10/2017 | Thubert et al. |
| 2017/0302691 A1 | 10/2017 | Singh et al. |
| 2017/0318034 A1* | 11/2017 | Holland ............ H04L 63/1416 |
| 2017/0331747 A1 | 11/2017 | Singh et al. |
| 2017/0346736 A1 | 11/2017 | Chander et al. |
| 2017/0364380 A1 | 12/2017 | Frye, Jr. et al. |
| 2018/0006911 A1 | 1/2018 | Dickey |
| 2018/0007115 A1 | 1/2018 | Nedeltchev et al. |
| 2018/0013670 A1 | 1/2018 | Kapadia et al. |
| 2018/0096081 A1* | 4/2018 | Voigt ............... G06F 16/254 |
| 2018/0145906 A1 | 5/2018 | Yadav et al. |
| 2020/0084121 A1* | 3/2020 | Matray ............ H04L 67/1097 |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| CN | 107196807 | 9/2017 |
| EP | 0811942 | 12/1997 |
| EP | 1076848 | 7/2002 |
| EP | 1383261 | 1/2004 |
| EP | 1450511 | 8/2004 |
| EP | 2045974 | 4/2008 |
| EP | 2043320 | 4/2009 |
| EP | 2860912 | 4/2015 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2015/099778 | 7/2015 |
| WO | WO 2016/004075 | 1/2016 |
| WO | WO 2016/019523 | 2/2016 |
| WO | WO 2016/196683 | 12/2016 |

OTHER PUBLICATIONS

Brocade Communications Systems, Inc., "Chapter 5—Configuring Virtual LANs (VLANs)," Jun. 2009, 38 pages.

Cisco Systems, Inc. "Cisco, Nexus 3000 Series NX-OS Release Notes, Release 5.0(3)U3(1)," Feb. 29, 2012, Part No. OL-26631-01, 16 pages.

Cisco Systems, Inc., "Cisco—VPN Client User Guide for Windows," Release 4.6, Aug. 2004, 148 pages.

Cisco Systems, Inc., "Cisco 4710 Application Control Engine Appliance Hardware Installation Guide," Nov. 2007, 66 pages.

Cisco Systems, Inc., "Cisco Data Center Network Architecture and Solutions Overview," Feb. 2006, 19 pages.

Cisco Systems, Inc., "Cisco IOS Configuration Fundamentals Configuration Guide: *Using Autoinstall and Setup*," Release 12.2, first published Apr. 2001, last updated Sep. 2003, 32 pages.

Cisco Systems, Inc., "Cisco VN-Link: Virtualization-Aware Networking," White Paper, Mar. 2009, 10 pages.

Cisco Systems, Inc., "Cisco, Nexus 5000 Series and Cisco Nexus 2000 Series Release Notes, Cisco NX-OS Release 5.1(3)N2(1b), NX-OS Release 5.1(3)N2(1a) and NX-OS Release 5.1(3)N2(1)," Sep. 5, 2012, Part No. OL-26652-03 CO, 24 pages.

Cisco Systems, Inc., "Nexus 3000 Series NX-OS Fundamentals Configuration Guide, Release 5.0(3)U3(1): *Using PowerOn Auto Provisioning*," Feb. 29, 2012, Part No. OL-26544-01, 10 pages.

Cisco Systems, Inc., "Quick Start Guide, Cisco ACE 4700 Series Application Control Engine Appliance," Software Ve740rsion A5(1. 0), Sep. 2011, 138 pages.

Cisco Systems, Inc., "Routing and Bridging Guide, Cisco ACE Application Control Engine," Software Version A5(1.0), Sep. 2011, 248 pages.

Cisco Systems, Inc., "VMWare and Cisco Virtualization Solution: Scale Virtual Machine Networking," Jul. 2009, 4 pages.

Cisco Systems, Inc., "Cisco Remote Integrated Service Engine for Citrix NetScaler Appliances and Cisco Nexus 7000 Series Switches Configuration Guide," Last modified Apr. 29, 2014, 78 pages.

Cisco Technology, Inc., "Cisco IOS Software Release 12.4T Features and Hardware Support," Feb. 2009, 174 pages.

Cisco Systems, Inc., "Cisco Application Control Engine (ACE) Troubleshooting Guide—Understanding the ACE Module Architecture and Traffic Flow," Mar. 11, 2011, 6 pages.

Costa, Raul, et al., "An Intelligent Alarm Management System for Large-Scale Telecommunication Companies," In Portuguese Conference on Artificial Intelligence, Oct. 2009, 14 pages.

(56) References Cited

OTHER PUBLICATIONS

De Carvalho, Tiago Filipe Rodrigues, "Root Cause Analysis in Large and Complex Networks," Dec. 2008, Repositorio.ul.pt, pp. 1-55.
Foundation for Intelligent Physical Agents, "FIPA Agent Message Transport Service Specification," Dec. 3, 2002, http://www.fipa.org; 15 pages.
Gia, Tuan Nguyen, et al., "Fog Computing in Healthcare Internet of Things: A Case Study on ECG Feature Extraction," 2015 IEEE International Conference on Computer and Information Technology; Ubiquitous Computing and Communications; Dependable, Autonomic and Secure Computing; Pervasive Intelligence and Computing, Oct. 26, 2015, pp. 356-363.
Joseph, Dilip, et al., "Modeling Middleboxes," IEEE Network, Sep./Oct. 2008, pp. 20-25.
Kent, S., et al. "Security Architecture for the Internet Protocol," Network Working Group, Nov. 1998, 67 pages.
Online Collins English Dictionary, 1 page (Year: 2018).
Voris, Jonathan, et al., "Bait and Snitch: Defending Computer Systems with Decoys," Columbia University Libraries, Department of Computer Science, 2013, pp. 1-25.
Bosch, Greg, "Virtualization," 2010, 33 pages.
Breen, Christopher, "MAC 911, How to dismiss Mac App Store Notifications," Macworld.com, Mar. 24, 2014, 3 pages.
Chou, C.W., et al., "Optical Clocks and Relativity," Science vol. 329, Sep. 24, 2010, pp. 1630-1633.
Huang, Hing-Jie, et al., "Clock Skew Based Node Identification in Wireless Sensor Networks," IEEE, 2008, 5 pages.
Ives, Herbert, E., et al., "An Experimental Study of the Rate of a Moving Atomic Clock," Journal of the Optical Society of America, vol. 28, No. 7, Jul. 1938, pp. 215-226.
Witze, Alexandra, "Special relativity aces time trial, 'Time dilation' predicted by Einstein confirmed by lithium ion experiment," Nature, Sep. 19, 2014, 3 pages.
Zatrochova, Zuzana, "Analysis and Testing of Distributed NoSQL Datastore Riak," Spring, 2015, 76 pages.
International Search Report and Written Opinion and Written Opinion from the International Searching Authority, dated Jun. 19, 2018, 10 pages, for the corresponding International Application No. PCT/US2018/024730.
Arista Networks, Inc., "Application Visibility and Network Telemtry using Splunk," Arista White Paper, Nov. 2013, 11 pages.
Bauch, Petr, "Reader's Report of Master's Thesis, Analysis and Testing of Distributed NoSQL Datastore Riak," May 28, 2015, Brno. 2 pages.
Cisco Systems, Inc., "Cisco Application Visibility and Control," Oct. 2011, 2 pages.
Cisco Systems, Inc., "Cisco Tetration Platform Data Sheet", Updated Mar. 5, 2018, 21 pages.
Duan, Yiheng, et al., Detective: Automatically Identify and Analyze Malware Processes in Forensic Scenarios via DLLs, IEEE ICC 2015—Next Generation Networking Symposium, pp. 5691-5696.
Heckman, Sarah, et al., "On Establishing a Benchmark for Evaluating Static Analysis Alert Prioritization and Classification Techniques," IEEE, 2008; 10 pages.
Kim, Myung-Sup, et al. "A Flow-based Method for Abnormal Network Traffic Detection," IEEE, 2004, pp. 599-612.
Thomas, R., "Bogon Dotted Decimal List," Version 7.0, Team Cymru NOC, Apr. 27, 2012, 5 pages.
Australian Government Department of Defence, Intelligence and Security, "Top 4 Strategies to Mitigate Targeted Cyber Intrusions," Cyber Security Operations Centre Jul. 2013, http://www.asd.gov.au/intosec/top-mitigations/top-4-strategies-explained.htm.
Author Unknown, "Blacklists & Dynamic Reputation: Understanding Why the Evolving Threat Eludes Blacklists," www.dambala.com, 9 pages, Dambala, Atlanta, GA, USA.
Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.
Backes, Michael, et al., "Data Lineage in Malicious Environments," IEEE 2015, pp. 1-13.
Bayati, Mohsen, et al., "Message-Passing Algorithms for Sparse Network Alignment," Mar. 2013, 31 pages.
Berezinski, Przemyslaw, et al., "An Entropy-Based Network Anomaly Detection Method," Entropy, 2015, vol. 17, www.mdpi.com/journal/entropy, pp. 2367-2408.
Berthier, Robin, et al. "Nfsight: Netflow-based Network Awareness Tool," 2010, 16 pages.
Bhuyan, Dhiraj, "Fighting Bots and Botnets," 2006, pp. 23-28.
Blair, Dana, et al., U.S. Appl. No. 62/106,006, tiled Jan. 21, 2015, entitled "Monitoring Network Policy Compliance."
Chandran, Midhun, et al., "Monitoring in a Virtualized Environment," GSTF International Journal on Computing, vol. 1, No. 1, Aug. 2010.
Chari, Suresh, et al., "Ensuring continuous compliance through reconciling policy with usage," Proceedings of the $18^{th}$ ACM symposium on Access control models and technologies (SACMAT '13). ACM, New York, NY, USA, 49-60.
Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.
Cisco Systems, "Cisco Network Analysis Modules (NAM) Tutorial," Cisco Systems, Inc., Version 3.5.
Cisco Systems, Inc., "Addressing Compliance from One Infrastructure: Cisco Unified Compliance Solution Framework," 2014.
Cisco Systems, Inc., "Cisco Application Dependency Mapping Service," 2009.
Cisco Systems, Inc., "White Paper—New Cisco Technologies Help Customers Achieve Regulatory Compliance," 1992-2008.
Cisco Systems, Inc., "A Cisco Guide to Defending Against Distributed Denial of Service Attacks," May 3, 2016, 34 pages.
Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.
Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.
Feinstein, Laura, et al., "Statistical Approaches to DDoS Attack Detection and Response," Proceedings of the DARPA Information Survivability Conference and Exposition (DISCEX '03), Apr. 2003, 12 pages.
George, Ashley, et al., "NetPal: A Dynamic Network Administration Knowledge Base," 2008, pp. 1-14.
Goldsteen, Abigail, et al., "A Tool for Monitoring and Maintaining System Trustworthiness at Run Time," REFSQ (2015), pp. 142-147.
Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.
Hewlett-Packard, "Effective use of reputation intelligence in a security operations center," Jul. 2013, 6 pages.
Hideshima, Yusuke, et al., "STARMINE: A Visualization System for Cyber Attacks," https://www.researchgate.net/publication/221536306, Feb. 2006, 9 pages.
InternetPerils, Inc., "Control Your Internet Business Risk," 2003-2015, https://www.internetperils.com.
Janoff, Christian, et al., "Cisco Compliance Solution for HIPAA Security Rule Design and Implementation Guide," Cisco Systems, Inc., Updated Nov. 14, 2015, part 1 of 2, 350 pages.
Janoff, Christian, et al., "Cisco Compliance Solution for HIPAA Security Rule Design and Implementation Guide," Cisco Systems, Inc., Updated Nov. 14, 2015, part 2 of 2, 588 pages.
Kerrison, Adam, et al., "Four Steps to Faster, Better Application Dependency Mapping—Laying the Foundation for Effective Business Service Models," BMCSoftware, 2011.
Kraemer, Brian, "Get to know your data center with CMDB," TechTarget, Apr. 5, 2006, http://searchdatacenter.techtarget.com/news/118820/Get-to-know-our-data-center-with-CMDB.
Lab SKU, "VMware Hands-on Labs—HOL-SDC-1301" Version: 20140321-160709, 2013; http://docs.hol.vmware.com/HOL-2013/holsdc-1301_html_en/ (part 1 of 2).

(56) References Cited

OTHER PUBLICATIONS

Lab SKU, "VMware Hands-on Labs—HOL-SDC-1301" Version: 20140321-160709, 2013; http://docs.hol.vmware.com/HOL-2013/holsdc-1301_html_en/ (part 2 of 2).
Lachance, Michael, "Dirty Little Secrets of Application Dependency Mapping," Dec. 26, 2007.
Landman, Yoav, et al., "Dependency Analyzer," Feb. 14, 2008, http://jfrog.com/confluence/display/DA/Home.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (GLOBECOM 2010, Dec. 2010, 6 pages.
Li, Bingbong, et al, "A Supervised Machine Learning Approach to Classify Host Roles On Line Using sFlow," in Proceedings of the first edition workshop on High performance and programmable networking, 2013, ACM, New York, NY, USA, 53-60.
Liu, Ting, et al., "Impala: A Middleware System for Managing Autonomic, Parallel Sensor Systems," In Proceedings of the Ninth ACM SIGPLAN Symposium on Principles and Practice of Parallel Programming(PPoPP '03), ACM, New York, NY, USA, Jun. 11-13, 2003, pp. 107-118.
Lu, Zhonghai, et al., "Cluster-based Simulated Annealing for Mapping Cores onto 2D Mesh Networks on Chip," Design and Diagnostics of Electronic Circuits and Systems, pp. 1, 6, 16-18, Apr. 2008.
Matteson, Ryan, "Depmap: Dependency Mapping of Applications Using Operating System Events: a Thesis," Master's Thesis, California Polytechnic State University, Dec. 2010.
Natarajan, Arun, et al., "NSDMiner: Automated Discovery of Network Service Dependencies," Institute of Electrical and Electronics Engineers INFOCOM, Feb. 2012, 9 pages.
Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.
Neverfail, "Neverfail IT Continuity Architect," 2015, https://web.archive.org/web/20150908090456/http://www.neverfailgroup.com/products/it-continuity-architect.
Nilsson, Dennis K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.
Nunnally, Troy, et al., "P3D: A Parallel 3D Coordinate Visualization for Advanced Network Scans," IEEE 2013, Jun. 9-13, 2013, 6 pages.
O'Donnell, Glenn, et al., "The CMDB Imperative: How to Realize the Dream and Avoid the Nightmares," Prentice Hall, Feb. 19, 2009.
Ohta, Kohei, et al., "Detection, Defense, and Tracking of Internet-Wide Illegal Access in a Distributed Manner," 2000, pp. 1-16.
Pathway Systems International Inc., "How Blueprints does Integration," Apr. 15, 2014, 9 pages, http://pathwaysystems.com/company-blog/.
Pathway Systems International Inc., "What is Blueprints?" 2010-2016, http://pathwaysystems.com/blueprints-about/.
Popa, Lucian, et al., "Macroscope: End-Point Approach to Networked Application Dependency Discovery," CoNEXT'09, Dec. 1-4, 2009, Rome, Italy, 12 pages.
Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.
Sachan, Mrinmaya, et al., "Solving Electrical Networks to incorporate Supervision in Random Walks," May 13-17, 2013, pp. 109-110.
Sammarco, Matteo, et al., "Trace Selection for Improved WLAN Monitoring," Aug. 16, 2013, pp. 9-14.
Shneiderman, Ben, et al., "Network Visualization by Semantic Substrates," Visualization and Computer Graphics, vol. 12, No. 5, pp. 733,740, Sep.-Oct. 2006.
Wang, Ru, et al., "Learning directed acyclic graphs via bootstarp aggregating," 2014, 47 pages, http://arxiv.org/abs/1406.2098.
Wang, Yongjun, et al., "A Network Gene-Based Framework for Detecting Advanced Persistent Threats," Nov. 2014, 7 pages.
Woodberg, Brad, "Snippet from Juniper SRX Series" Jun. 17, 2013, 1 page, O'Reilly Media, Inc.
Zhang, Yue, et al., "CANTINA: A Content-Based Approach to Detecting Phishing Web Sites," May 8-12, 2007, pp. 639-648.
Baek, Kwang-Hyun, et al., "Preventing Theft of Quality of Service on Open Platforms," 2005 Workshop of the 1$^{st}$ International Conference on Security and Privacy for Emerging Areas in Communication Networks, 2005, 12 pages.
Theodorakopoulos, George, et al., "On Trust Models and Trust Evaluation Metrics for Ad Hoc Networks," IEEE Journal on Selected Areas in Communications. vol. 24, Issue 2, Feb. 2006, pp. 318-328.
Zeng, Sai, et al., "Managing Risk in Multi-node Automation of Endpoint Management," 2014 IEEE Network Operations and Management Symposium (NOMS), 2014, 6 pages.
Communication pursuant to Article 94(3) EPC, issued by the European Patent Office, Aug. 12, 2020, 8 pages, for the corresponding European Patent Application No. EP18720434.2.
Sonnek, Jason, et al., "Starling: Minimizing Communication Overhead in Virtualized Computing Platforms Using Decentralized Affinity-Aware Migration," 2010 39$^{th}$ International Conference on Parallel Processing (ICPP), IEEE, Piscataway, NJ, USA, Sep. 13, 2010, pp. 228-237.

\* cited by examiner

US 10,873,794 B2

FLOWLET RESOLUTION FOR APPLICATION PERFORMANCE MONITORING AND MANAGEMENT

TECHNICAL FIELD

The subject matter of this disclosure relates in general to the field of computer networks, and more specifically for application performance monitoring and management.

BACKGROUND

An application performance management or application performance monitoring (APM) system is a tool that an enterprise can use to assess the states of applications operating in the enterprise's data center, such as availability, load, latency, and other performance issues that may arise for the applications. Some conventional networks rely on an application's built-in monitoring utilities but not every application includes these utilities. Moreover, taking such an ad-hoc approach for application monitoring may be untenable to manage for a typical enterprise network with hundreds or thousands of applications. Certain conventional APM platforms may require injecting code into an application to integrate the application with these platforms. This is a non-trivial task that can require careful coordination between the development team and the team tasked with managing the application thereafter. This can also affect the performance of the application because logging and other monitoring features occur directly in the execution path of the application. This approach is also inadequate for third party applications and/or applications deployed off-premises (e.g., via a software as a service (SaaS) or public cloud provider) that the enterprise cannot modify. Some conventional APM systems use measurement hardware and/or software on servers hosting applications while others may rely on similar tools on network devices. Both approaches can negatively affect performance of the hosting hardware and/or software. In addition, these techniques are incomplete as they neglect network performance over application performance or vice versa.

DESCRIPTION OF EXAMPLE EMBODIMENTS

Overview

An application and network analytics platform can capture telemetry (e.g., flow data, server data, process data, user data, policy data, etc.) from servers (e.g., physical and/or virtual servers) (sometimes also referred to as hosts, endpoints, computing devices, machines, and the like) and network devices (e.g., switches, routers, hubs, etc.) operating within a network. The application and network analytics platform can determine an application dependency map (ADM) for one or more applications executing in the network. Using the ADM, the application and network analytics platform can resolve flows into flowlets of varying granularities, and determine baseline metrics for the flowlets. The baseline metrics can include transmission times, processing times, and/or data sizes (in number of packets and/or bytes) for the flowlets. The application and network analytics platform can compare new flowlets against the baselines to assess availability, load, latency, and other performance metrics for one or more applications. In some embodiments, the application and network analytics platform can automate or substantially automate remediation of unavailability, load, latency, and other application performance issues.

Description

Figure 1:
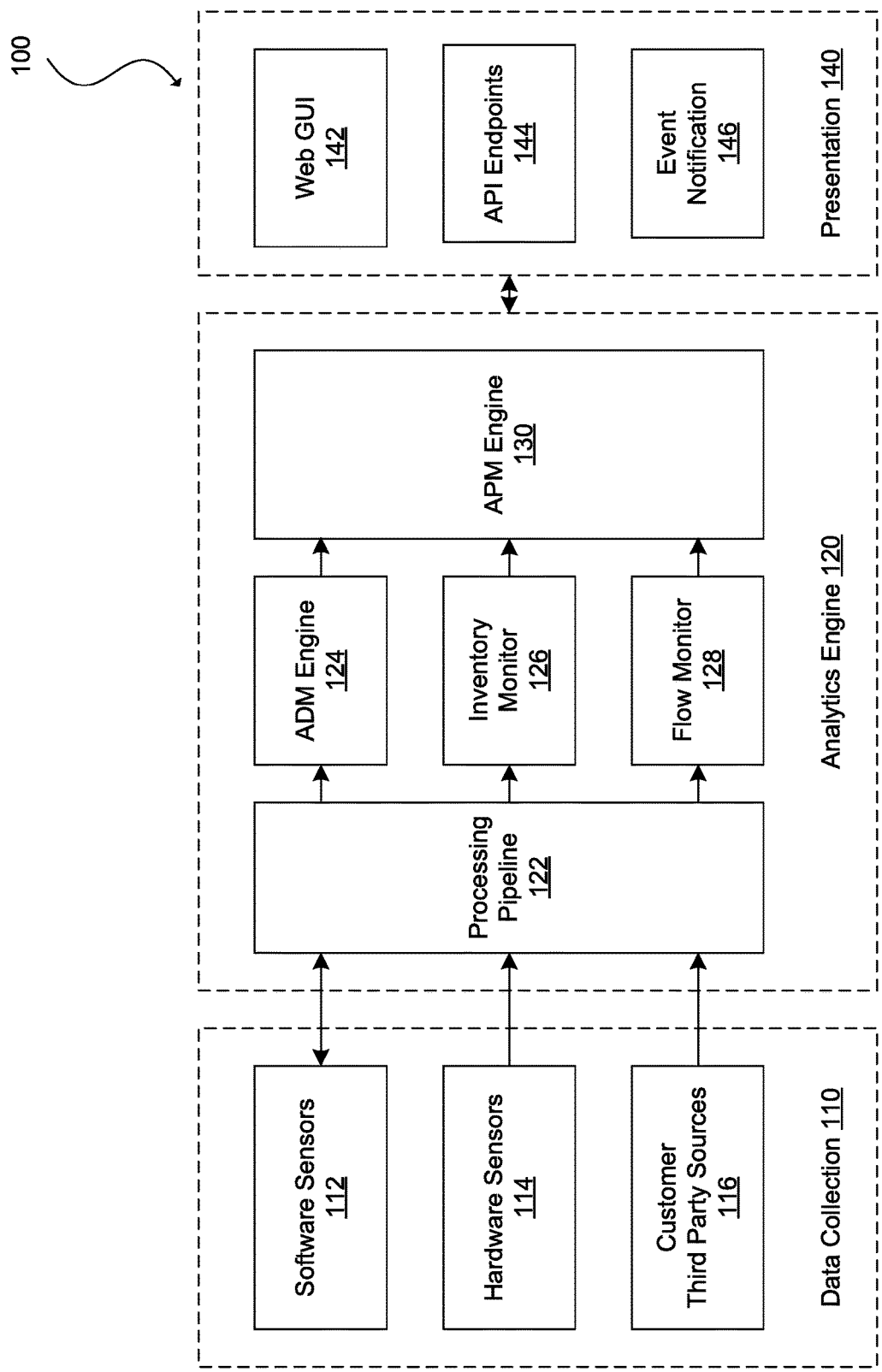
FIG. 1 illustrates an example of an application and network analytics platform for providing application performance monitoring (APM) in accordance with an embodiment.

FIG. 1 illustrates an example of an application and network analytics platform 100 in accordance with an embodiment. Tetration Analytics™ provided by Cisco Systems®, Inc. of San Jose Calif. is an example implementation of the application and network analytics platform 100. However, one skilled in the art will understand that FIG. 1 (and generally any system discussed in this disclosure) is but one possible embodiment of an application and network analytics platform and that other embodiments can include additional, fewer, or alternative components arranged in similar or alternative orders, or in parallel, unless otherwise stated. In the example of FIG. 1, the application and network analytics platform 100 includes a data collection layer 110, an analytics engine 120, and a presentation layer 140.

The data collection layer 110 may include software sensors 112, hardware sensors 114, and customer/third party data sources 116. The software sensors 112 can run within servers of a network, such as physical or bare-metal servers; hypervisors, virtual machine monitors, container orchestrators, or other virtual entity managers; virtual machines, containers, or other virtual entities. The hardware sensors 114 can reside on the application-specific integrated circuits (ASICs) of switches, routers, or other network devices (e.g., packet capture (pcap) appliances such as a standalone packet monitor, a device connected to a network device's monitoring port, a device connected in series along a main trunk of a data center, or similar device). The software sensors 112 can capture telemetry (e.g., flow data, server data, process data, user data, policy data, etc.) from the servers and the hardware sensors 114 can capture network telemetry (e.g., flow data) from network devices, and send the telemetry to the analytics engine 120 for further processing. For example, the software sensors 112 can sniff packets sent over their hosts' physical or virtual network interface cards (NICs), or individual processes on each server can report the telemetry to the software sensors 112. The hardware sensors 114 can capture network telemetry at line rate from all ports of the network devices hosting the hardware sensors.

Figure 2:
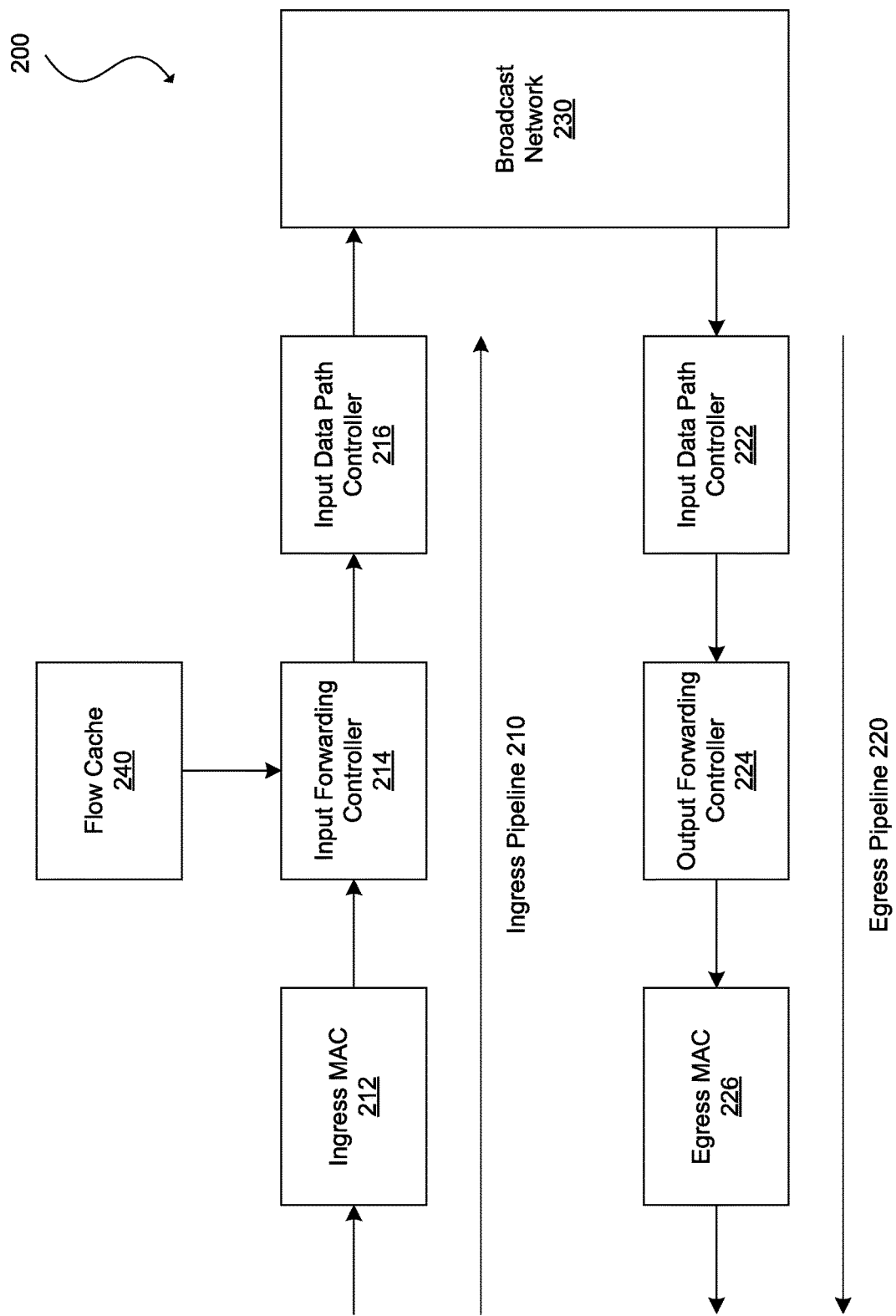
FIG. 2 illustrates an example of a forwarding pipeline of an application-specific integrated circuit (ASIC) of a network device in accordance with an embodiment.

FIG. 2 illustrates an example of a unicast forwarding pipeline 200 of an ASIC for a network device that can capture network telemetry at line rate with minimal impact on the CPU. In some embodiments, one or more network devices may incorporate the Cisco® ASE2 or ASE3 ASICs for implementing the forwarding pipeline 200. For example, certain embodiments include one or more Cisco Nexus® 9000 Series Switches provided by Cisco Systems® that utilize the ASE2 or ASE3 ASICs or equivalent ASICs. The ASICs may have multiple slices (e.g., the ASE2 and ASE3 have six slices and two slices, respectively) in which each slice represents a switching subsystem with both an ingress forwarding pipeline 210 and an egress forwarding pipeline 220. The ingress forwarding pipeline 210 can include an input/output (I/O) component, ingress MAC 212; an input forwarding controller 214; and an input data path controller 216. The egress forwarding pipeline 220 can include an output data path controller 222, an output forwarding controller 224, and an I/O component, egress MAC 226. The slices may connect to a broadcast network 230 that can provide point-to-multipoint connections from each slice and all-to-all connectivity between slices. The broadcast network 230 can provide enough bandwidth to support full-line-rate forwarding between all slices concurrently. When a packet enters a network device, the packet goes through the ingress forwarding pipeline 210 of the slice on which the port of the ingress MAC 212 resides, traverses the broadcast network 230 to get onto the egress slice, and then goes through the egress forwarding pipeline 220 of the egress slice. The input forwarding controller 214 can receive the packet from the port of the ingress MAC 212, parse the packet headers, and perform a series of lookups to determine whether to forward the packet and how to forward the packet to its intended destination. The input forwarding controller 214 can also generate instructions for the input data path controller 216 to store and queue the packet. In some embodiments, the network device may be a cut-through switch such that the network device performs input forwarding while storing the packet in a pause buffer block (not shown) of the input data path controller 216.

As discussed, the input forwarding controller 214 may perform several operations on an incoming packet, including parsing the packet header, performing an L2 lookup, performing an L3 lookup, processing an ingress access control list (ACL), classifying ingress traffic, and aggregating forwarding results. Although describing the tasks performed by the input forwarding controller 214 in this sequence, one of ordinary skill will understand that, for any process discussed herein, there can be additional, fewer, or alternative steps performed in similar or alternative orders, or in parallel, within the scope of the various embodiments unless otherwise stated.

In some embodiments, when a unicast packet enters through a front-panel port (e.g., a port of ingress MAC 212), the input forwarding controller 214 may first perform packet header parsing. For example, the input forwarding controller 214 may parse the first 128 bytes of the packet to extract and save information such as the L2 header, EtherType, L3 header, and TCP IP protocols.

As the packet goes through the ingress forwarding pipeline 210, the packet may be subject to L2 switching and L3 routing lookups. The input forwarding controller 214 may first examine the destination MAC address of the packet to determine whether to switch the packet (i.e., L2 lookup) or route the packet (i.e., L3 lookup). For example, if the destination MAC address matches the network device's own MAC address, the input forwarding controller 214 can perform an L3 routing lookup. If the destination MAC address does not match the network device's MAC address, the input forwarding controller 214 may perform an L2 switching lookup based on the destination MAC address to determine a virtual LAN (VLAN) identifier. If the input forwarding controller 214 finds a match in the MAC address table, the input forwarding controller 214 can send the packet to the egress port. If there is no match for the destination MAC address and VLAN identifier, the input forwarding controller 214 can forward the packet to all ports in the same VLAN.

During L3 routing lookup, the input forwarding controller 214 can use the destination IP address for searches in an L3 host table. This table can store forwarding entries for directly attached hosts and learned /32 host routes. If the destination IP address matches an entry in the host table, the entry will provide the destination port, next-hop MAC address, and egress VLAN. If the input forwarding controller 214 finds no match for the destination IP address in the host table, the input forwarding controller 214 can perform a longest-prefix match (LPM) lookup in an LPM routing table.

In addition to forwarding lookup, the input forwarding controller 214 may also perform ingress ACL processing on the packet. For example, the input forwarding controller 214 may check ACL ternary content-addressable memory (TCAM) for ingress ACL matches. In some embodiments, each ASIC may have an ingress ACL TCAM table of 4000 entries per slice to support system internal ACLs and user-defined ingress ACLs. These ACLs can include port ACLs, routed ACLs, and VLAN ACLs, among others. In some embodiments, the input forwarding controller 214 may localize the ACL entries per slice and program them only where needed.

In some embodiments, the input forwarding controller 214 may also support ingress traffic classification. For example, from an ingress interface, the input forwarding controller 214 may classify traffic based on the address field, IEEE 802.1q class of service (CoS), and IP precedence or differentiated services code point in the packet header. In some embodiments, the input forwarding controller 214 can assign traffic to one of eight quality-of-service (QoS) groups. The QoS groups may internally identify the traffic classes used for subsequent QoS processes as packets traverse the system.

In some embodiments, the input forwarding controller 214 may collect the forwarding metadata generated earlier in the pipeline (e.g., during packet header parsing, L2 lookup, L3 lookup, ingress ACL processing, ingress traffic classification, forwarding results generation, etc.) and pass it downstream through the input data path controller 216. For example, the input forwarding controller 214 can store a 64-byte internal header along with the packet in the packet buffer. This internal header can include 16 bytes of iETH (internal communication protocol) header information, which the input forwarding controller 214 can prepend to the packet when transferring the packet to the output data path controller 222 through the broadcast network 230. The network device can strip the 16-byte iETH header when the packet exits the front-panel port of the egress MAC 226. The network device may use the remaining internal header space (e.g., 48 bytes) to pass metadata from the input forwarding queue to the output forwarding queue for consumption by the output forwarding engine.

In some embodiments, the input data path controller 216 can perform ingress accounting functions, admission functions, and flow control for a no-drop class of service. The ingress admission control mechanism can determine whether to admit the packet into memory based on the amount of buffer memory available and the amount of buffer space already used by the ingress port and traffic class. The input data path controller 216 can forward the packet to the output data path controller 222 through the broadcast network 230.

As discussed, in some embodiments, the broadcast network 230 can comprise a set of point-to-multipoint wires that provide connectivity between all slices of the ASIC. The input data path controller 216 may have a point-to-multipoint connection to the output data path controller 222 on all slices of the network device, including its own slice.

In some embodiments, the output data path controller 222 can perform egress buffer accounting, packet queuing, scheduling, and multicast replication. In some embodiments, all ports can dynamically share the egress buffer resource. In some embodiments, the output data path controller 222 can also perform packet shaping. In some embodiments, the network device can implement a simple egress queuing architecture. For example, in the event of egress port congestion, the output data path controller 222 can directly queue packets in the buffer of the egress slice. In some embodiments, there may be no virtual output queues (VoQs) on the ingress slice. This approach can simplify system buffer management and queuing.

As discussed, in some embodiments, one or more network devices can support up to 10 traffic classes on egress, 8 user-defined classes identified by QoS group identifiers, a CPU control traffic class, and a switched port analyzer (SPAN) traffic class. Each user-defined class can have a unicast queue and a multicast queue per egress port. This approach can help ensure that no single port will consume more than its fair share of the buffer memory and cause buffer starvation for other ports.

In some embodiments, multicast packets may go through similar ingress and egress forwarding pipelines as the unicast packets but instead use multicast tables for multicast forwarding. In addition, multicast packets may go through a multistage replication process for forwarding to multiple destination ports. In some embodiments, the ASIC can include multiple slices interconnected by a non-blocking internal broadcast network. When a multicast packet arrives at a front-panel port, the ASIC can perform a forwarding lookup. This lookup can resolve local receiving ports on the same slice as the ingress port and provide a list of intended receiving slices that have receiving ports in the destination multicast group. The forwarding engine may replicate the packet on the local ports, and send one copy of the packet to the internal broadcast network, with the bit vector in the internal header set to indicate the intended receiving slices. In this manner, only the intended receiving slices may accept the packet off of the wire of the broadcast network. The slices without receiving ports for this group can discard the packet. The receiving slice can then perform local L3 replication or L2 fan-out lookup and replication to forward a copy of the packet to each of its local receiving ports.

In FIG. 2, the forwarding pipeline 200 also includes a flow cache 240, which when combined with direct export of collected telemetry from the ASIC (i.e., data hardware streaming), can enable collection of packet and flow metadata at line rate while avoiding CPU bottleneck or overhead. The flow cache 240 can provide a full view of packets and flows sent and received by the network device. The flow cache 240 can collect information on a per-packet basis, without sampling and without increasing latency or degrading performance of the network device. To accomplish this, the flow cache 240 can pull information from the forwarding pipeline 200 without being in the traffic path (i.e., the ingress forwarding pipeline 210 and the egress forwarding pipeline 220).

In addition to the traditional forwarding information, the flow cache 240 can also collect other metadata such as detailed IP and TCP flags and tunnel endpoint identifiers. In some embodiments, the flow cache 240 can also detect anomalies in the packet flow such as inconsistent TCP flags. The flow cache 240 may also track flow performance information such as the burst and latency of a flow. By providing this level of information, the flow cache 240 can produce a better view of the health of a flow. Moreover, because the flow cache 240 does not perform sampling, the flow cache 240 can provide complete visibility into the flow.

In some embodiments, the flow cache 240 can include an events mechanism to complement anomaly detection. This configurable mechanism can define a set of parameters that represent a packet of interest. When a packet matches these parameters, the events mechanism can trigger an event on the metadata that triggered the event (and not just the accumulated flow information). This capability can give the flow cache 240 insight into the accumulated flow information as well as visibility into particular events of interest. In this manner, networks, such as a network implementing the application and network analytics platform 100, can capture telemetry more comprehensively and not impact application and network performance.

Returning to FIG. 1, the telemetry captured by the software sensors 112 and hardware sensors 114 can include metadata relating to individual packets (e.g., packet size, source address, source port, destination address, destination port, etc.); flows (e.g., number of packets and aggregate size of packets having the same source address/port, destination address/port, L3 protocol type, class of service, router/switch interface, etc. sent/received without inactivity for a certain time (e.g., 15 seconds) or sent/received over a certain duration (e.g., 30 minutes)); flowlets (e.g., flows of sub-requests and sub-responses generated as part of an original request or response flow and sub-flows of these flows); bidirectional flows (e.g., flow data for a request/response pair of flows having corresponding source address/port, destination address/port, etc.); groups of flows (e.g., flow data for flows associated with a certain process or application, server, user, etc.), sessions (e.g., flow data for a TCP session); or other types of network communications of specified granularity. That is, the network telemetry can generally include any information describing communication on all layers of the Open Systems Interconnection (OSI) model. In some embodiments, the network telemetry collected by the sensors 112 and 114 can also include other network traffic data such as hop latency, packet drop count, port utilization, buffer information (e.g., instantaneous queue length, average queue length, congestion status, etc.), and other network statistics.

In some embodiments, the application and network analytics platform 100 can resolve flows into flowlets (i.e., sequences of requests and responses of a larger request and response) of various granularities. For example, a response to a request to an enterprise application may result in multiple sub-requests and sub-responses to various back-end services (e.g., authentication, static content, data, search, sync, etc.). The application and network analytics platform 100 can break a flow into its constituent components to provide greater insight into application and network performance. The application and network analytics platform 100 can perform this resolution in real time or substantially real time (e.g., no more than a few minutes after detecting the flow).

The application and network analytics platform 100 can associate a flow with a server sending or receiving the flow, an application or process triggering the flow, the owner of the application or process, and one or more policies applicable to the flow, among other telemetry. The telemetry captured by the software sensors 112 can thus include server data, process data, user data, policy data, and other data (e.g., virtualization information, tenant information, sensor information, etc.). The server telemetry can include the server name, network address, CPU usage, network usage, disk space, ports, logged users, scheduled jobs, open files, and similar information. In some embodiments, the server telemetry can also include information about the file system of the server, such as the lists of files (e.g., log files, configuration files, device special files, etc.) and/or directories stored within the file system as well as the metadata for the files and directories (e.g., presence, absence, or modifications of a file and/or directory). In some embodiments, the server telemetry can further include physical or virtual configuration information (e.g., processor type, amount of random access memory (RAM), amount of disk or storage, type of storage, system type (e.g., 32-bit or 64-bit), operating system, public cloud provider, virtualization platform, etc.).

The process telemetry can include the process name (e.g., bash, httpd, netstat, etc.), process identifier, parent process identifier, path to the process (e.g., /usr2/username/bin/, /usr/local/bin, /usr/bin, etc.), CPU utilization, memory utilization, memory address, scheduling information, nice value, flags, priority, status, start time, terminal type, CPU time taken by the process, and the command string that initiated the process (e.g., "/opt/tetration/collectorket-collector --config_file/etatetration/collector/collector.config -- timestamp_ flow_info --logtostderr --utc_time_in_file_name true --max_num_ssl_sw_sensors 63000 --enable_client_certificate true"). The user telemetry can include information regarding a process owner, such as the user name, user identifier, user's real name, e-mail address, user's groups, terminal information, login time, expiration date of login, idle time, and information regarding files and/or directories of the user.

The customer/third party data sources 116 can include out-of-band data such as power level, temperature, and physical location (e.g., room, row, rack, cage door position, etc.). The customer/third party data sources 116 can also include third party data regarding a server such as whether the server is on an IP watch list or security report (e.g., provided by Cisco®, Arbor Networks® of Burlington, Mass., Symantec® Corp. of Sunnyvale, Calif., Sophos® Group plc of Abingdon, England, Microsoft® Corp. of Seattle, Wash., Verizon® Communications, Inc. of New York, N.Y., among others), geolocation data, and Whois data, and other data from external sources.

In some embodiments, the customer/third party data sources 116 can include data from a configuration management database (CMDB) or configuration management system (CMS) as a service. The CMDB/CMS may transmit configuration data in a suitable format (e.g., JavaScript® object notation (JSON), extensible mark-up language (XML), yet another mark-up language (YAML), etc.)).

The processing pipeline 122 of the analytics engine 120 can collect and process the telemetry. In some embodiments, the processing pipeline 122 can retrieve telemetry from the software sensors 112 and the hardware sensors 114 every 100 ms or faster. Thus, the application and network analytics platform 100 may not miss or is much less likely than conventional systems (which typically collect telemetry every 60 seconds) to miss "mouse" flows. In addition, as the telemetry tables flush so often, the software sensors 112 and the hardware sensors 114 do not or are much less likely than conventional systems to drop telemetry because of overflow/ lack of memory. An additional advantage of this approach is that the application and network analytics platform is responsible for flow-state tracking instead of network devices. Thus, the ASICs of the network devices of various embodiments can be simpler or can incorporate other features.

In some embodiments, the processing pipeline 122 can filter out extraneous or duplicative data or it can create summaries of the telemetry. In some embodiments, the processing pipeline 122 may process (and/or the software sensors 112 and hardware sensors 114 may capture) only certain types of telemetry and disregard the rest. For example, the processing pipeline 122 may process (and/or the sensors may monitor) only high-priority telemetry, telemetry associated with a particular subnet (e.g., finance department, human resources department, etc.), telemetry associated with a particular application (e.g., business-critical applications, compliance software, health care applications, etc.), telemetry from external-facing servers, etc. As another example, the processing pipeline 122 may process (and/or the sensors may capture) only a representative sample of telemetry (e.g., every 1,000th packet or other suitable sample rate).

Collecting and/or processing telemetry from multiple servers of the network (including within multiple partitions of virtualized hosts) and from multiple network devices operating between the servers can provide a comprehensive view of network behavior. The capture and/or processing of telemetry from multiple perspectives rather than just at a single device located in the data path (or in communication with a component in the data path) can allow the data to be correlated from the various data sources, which may be used as additional data points by the analytics engine 120.

In addition, collecting and/or processing telemetry from multiple points of view can enable capture of more accurate data. For example, a conventional network may consist of external-facing network devices (e.g., routers, switches, network appliances, etc.) such that the conventional network may not be capable of monitoring east-west traffic, including telemetry for VM-to-VM or container-to-container communications on a same host. As another example, the conventional network may drop some packets before those packets traverse a network device incorporating a sensor. The processing pipeline 122 can substantially mitigate or eliminate these issues altogether by capturing and processing telemetry from multiple points of potential failure. Moreover, the processing pipeline 122 can verify multiple instances of data for a flow (e.g., telemetry from a source (physical server, hypervisor, container orchestrator, other virtual entity manager, VM, container, and/or other virtual entity), one or more network devices, and a destination) against one another.

In some embodiments, the processing pipeline 122 can assess a degree of accuracy of telemetry for a single flow captured by multiple sensors and utilize the telemetry from a single sensor determined to be the most accurate and/or complete. The degree of accuracy can be based on factors such as network topology (e.g., a sensor closer to the source may be more likely to be more accurate than a sensor closer to the destination), a state of a sensor or a server hosting the sensor (e.g., a compromised sensor/server may have less accurate telemetry than an uncompromised sensor/server), or telemetry volume (e.g., a sensor capturing a greater amount of telemetry may be more accurate than a sensor capturing a smaller amount of telemetry).

In some embodiments, the processing pipeline 122 can assemble the most accurate telemetry from multiple sensors.

For instance, a first sensor along a data path may capture data for a first packet of a flow but may be missing data for a second packet of the flow while the reverse situation may occur for a second sensor along the data path. The processing pipeline 122 can assemble data for the flow from the first packet captured by the first sensor and the second packet captured by the second sensor.

In some embodiments, the processing pipeline 122 can also disassemble or decompose a flow into sequences of request and response flowlets (e.g., sequences of requests and responses of a larger request or response) of various granularities. For example, a response to a request to an enterprise application may result in multiple sub-requests and sub-responses to various back-end services (e.g., authentication, static content, data, search, sync, etc.). The processing pipeline 122 can break a flow down into its constituent components to provide greater insight into application and network performance. The processing pipeline 122 can perform this resolution in real time or substantially real time (e.g., no more than a few minutes after detecting the flow).

The processing pipeline 122 can store the telemetry in a data lake (not shown), a large-scale storage repository characterized by massive storage for various types of data, enormous processing power, and the ability to handle nearly limitless concurrent tasks or jobs. In some embodiments, the analytics engine 120 may deploy at least a portion of the data lake using the Hadoop® Distributed File System (HDFS™) from Apache® Software Foundation of Forest Hill, Md. HDFS™ is a highly scalable and distributed file system that can scale to thousands of cluster nodes, millions of files, and petabytes of data. A feature of HDFS™ is its optimization for batch processing, such as by coordinating data computation to where data is located. Another feature of HDFS™ is its utilization of a single namespace for an entire cluster to allow for data coherency in a write-once, read-many access model. A typical HDFS™ implementation separates files into blocks, which are typically 64 MB in size and replicated in multiple data nodes. Clients can access data directly from the data nodes.

The processing pipeline 122 can propagate the processed data to one or more engines, monitors, and other components of the analytics engine 120 (and/or the components can retrieve the data from the data lake), such as an application dependency mapping (ADM) engine 124, an inventory monitor 126, a flow monitor 128, and an application performance monitoring (APM) engine 130.

The ADM engine 124 can determine dependencies of applications running in the network, i.e., how processes on different servers interact with one another to perform the functions of the application. Particular patterns of traffic may correlate with particular applications. The ADM engine 124 can evaluate telemetry processed by the processing pipeline 122 to determine the interconnectivity or dependencies of the application to generate a graph for the application (i.e., an application dependency mapping). For example, in a conventional three-tier architecture for a web application, first servers of the web tier, second servers of the application tier, and third servers of the data tier make up the web application. From flow data, the ADM engine 124 may determine that there is first traffic flowing between external servers on port 80 of the first servers corresponding to Hypertext Transfer Protocol (HTTP) requests and responses. The flow data may also indicate second traffic between first ports of the first servers and second ports of the second servers corresponding to application server requests and responses and third traffic flowing between third ports of the second servers and fourth ports of the third servers corresponding to database requests and responses. The ADM engine 124 may define an application dependency map or graph for this application as a three-tier application including a first endpoint group (EPG) (i.e., groupings of application tiers or clusters, applications, and/or application components for implementing forwarding and policy logic) comprising the first servers, a second EPG comprising the second servers, and a third EPG comprising the third servers.

The inventory monitor 126 can continuously track the network's assets (e.g., servers, network devices, applications, etc.) based on the telemetry processed by the processing pipeline 122. In some embodiments, the inventory monitor 126 can assess the state of the network at a specified interval (e.g., every 1 minute). That is, the inventory monitor 126 can periodically take snapshots of the states of applications, servers, network devices, and/or other elements of the network. In other embodiments, the inventory monitor 126 can capture the snapshots when events of interest occur, such as an application experiencing latency that exceeds an application latency threshold; the network experiencing latency that exceeds a network latency threshold; failure of a server, network device, or other network element; and similar circumstances. Snapshots can include a variety of telemetry associated with network elements. For example, a snapshot of a server can represent the processes executing on the server at a time of capture, the amount of CPU utilized by each process (e.g., as an amount of time and/or a relative percentage), the amount of memory utilized by each process (e.g., in bytes and/or as a relative percentage), the amount of disk utilized by each process (e.g., in bytes or as a relative percentage), and a distance (physical and/or logical, relative and/or absolute) from one or more other network elements.

In some embodiments, on a change to the network (e.g., a server updating its operating system or running a new process; a server communicating on a new port; a VM, container, or other virtualized entity migrating to a different host and/or subnet, VLAN, VxLAN, or other network segment; etc.), the inventory monitor 126 can alert the APM engine 130 to ensure that applications and the network remain performing as expected in view of the change(s) to the data center.

The flow monitor 128 can analyze flows to detect whether they are associated with anomalous or malicious traffic. In some embodiments, the flow monitor 128 may receive examples of past flows determined to perform at expectation (i.e., the length of time for the flow to reach a network device or a destination is within a threshold length of time) or perform below expectation (i.e., the length of time for the flow to reach the network device and/or destination exceeds the threshold length of time). The flow monitor 128 can utilize machine learning to analyze the telemetry processed by the processing pipeline 122 and classify each current flow based on similarity to past flows. On detection of an anomalous flow, such as a flow taking a shorter or longer duration from source to destination than a specified time range, a flow of a size less or more than a specified amount, or a flow previously classified as a network attack, the flow monitor 128 may transmit an alert to the APM engine 130 and/or to the presentation layer 140. In some embodiments, the network may operate within a trusted environment for a period of time so that the analytics engine 120 can establish a baseline of normal operation.

The APM engine 130 can be responsible for monitoring and managing applications running within the network. For example, the APM engine 130 may receive an alert from the inventory monitor 126 on a change to the network or an alert from the flow monitor upon the flow monitor 128 detecting an anomalous flow. The APM engine 130 can evaluate the telemetry to pinpoint the root cause of degraded performance. In some embodiments, the APM engine 130 can also perform remediation tasks, such as load balancing, migrating application components to be closer together (physically and/or logically), instantiating new server instances (in the private network and/or a public cloud), and disabling network connectivity for problematic servers, among other operations.

Figure 3:
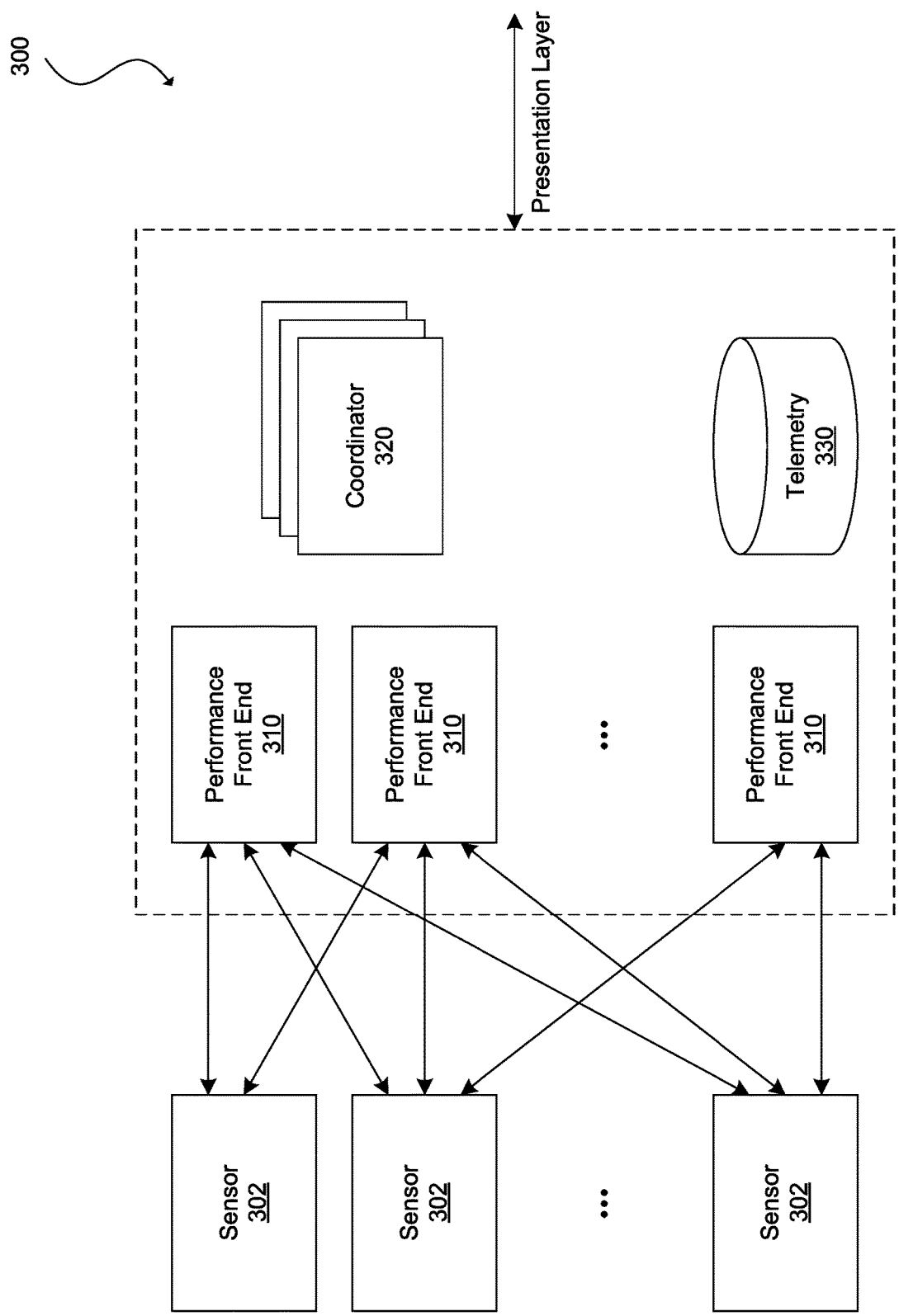
FIG. 3 illustrates an example of an APM engine in accordance with an embodiment.

FIG. 3 illustrates an example of an application performance monitoring (APM) engine 300 that represents one of many possible implementations of the APM engine 130. The APM engine 300 can include one or more performance front end processes (PFEs) 310, a coordinator cluster 320, and a telemetry store 330. While the APM engine 300 includes specific components in this example, one of ordinary skill in the art will understand that the configuration of the APM engine 300 is one possible configuration and that other configurations with more or less components are also possible.

FIG. 3 shows the PFEs 310 in communication with sensors 302. The sensors 302 represent one of many possible implementations of the software sensors 112 and/or hardware sensors 114 of FIG. 1. After installation on a server and/or network device of the data center, each sensor 302 can register with the coordinator cluster 320 via communication with one or more of the PFEs 310. Upon successful registration, the sensor 302 may begin capturing telemetry, including flow data, host data, process data, user data, policy data, etc. The sensors 302 may receive new configuration information from time to time, such as to capture additional telemetry for diagnostic purposes or for software upgrades. In some embodiments, the APM engine 300 may encode the configuration information in a high-level, platform-independent format. In some embodiments, each sensor 302 can determine its server's operating environment, convert the high-level configuration information into platform-specific configuration information, and apply certain platform-specific optimizations based on the operating environment. In other embodiments, the APM engine 300 may translate the high-level configuration information to the platform-specific format remotely from the sensors 302 before distribution.

In some embodiments, the PFEs 310 can be responsible for storing platform-independent configuration information in memory, handling registration of the sensors 302, monitoring updates to the configuration information, distributing the updates to the sensors 302, and collecting telemetry captured by the sensors 302. In the example of FIG. 3, the PFEs 310 can function as intermediaries between the sensors 302 and the coordinator cluster 320. This can add a layer of security between servers and the APM engine 300. For example, the sensors 302 can operate under the least-privileged principle having trust in only the coordinator cluster 320 and no trust in the PFEs 310. The sensors 302 and the PFEs 310 must sign and authenticate all transactions between them, including configuration and registration.

The coordinator cluster 320 can operate as the controller for the APM engine 300. In the example of FIG. 3, the coordinator cluster 320 implements a high availability scheme (e.g., ZooKeeper, doozerd, and etcd) in which the cluster elects one coordinator instance master and the remaining coordinator instances serve as standby instances. The coordinator cluster 320 can manage the assignment of the sensors 302 to the PFEs 310. In some embodiments, each sensor 302 may initially register with the PFE 310 closest (physically and/or logically) to the sensor's host but the coordinator cluster 320 may reassign the sensor to a different PFE, such as for load balancing and/or in the event of the failure of one or more of the PFEs 310. In some embodiments, the coordinator cluster 320 may use sharding for load balancing and providing high availability for the PFEs 310.

The telemetry store 330 can maintain sensor data captured by the sensors 302. In some embodiments, the APM engine can maintain recently captured and/or accessed telemetry in more readily-accessible data stores (e.g., solid state devices (SSD), optimized hard disk drives (HDD), etc.) and migrate older telemetry to less accessible data stores (e.g., commodity HDDs, tape, etc.). In some embodiments, the APM engine 300 may implement the telemetry store 330 using Druid® or other relational database platform. In other embodiments, the APM engine 300 may implement the telemetry store 330 using software provided by MongoDB®, Inc. of New York, N.Y. or other NoSQL database.

In some embodiments, the coordinator cluster 320 may also be responsible for load balancing the PFEs 310, ensuring high availability of the PFEs 310 to the sensors 302, and receiving and storing telemetry in the telemetry store 330. In other embodiments, the APM engine 300 can integrate the functionality of a PFE and a coordinator or further divide the functionality of the PFE and the coordinator into additional components.

Returning to FIG. 1, the presentation layer 140 can include a web graphical user interface (GUI) 142, API endpoints 144, and an event-based notification system 146. In some embodiments, the application and network analytics platform 100 may implement the web GUI 142 using Ruby on Rails™ as the web application framework. Ruby on Rails™ is model-view-controller (MVC) framework that provides default structures for a database, a web service, and web pages. Ruby on Rails™ relies on web standards such as JSON or XML for data transfer, and hypertext markup language (HTML), cascading style sheets, (CSS), and JavaScript® for display and user interfacing.

In some embodiments, the application and network analytics platform 100 can expose application programming interface (API) endpoints (e.g., such as those based on the simple object access protocol (SOAP), a service oriented architecture (SOA), a representational state transfer (REST) architecture, a resource oriented architecture (ROA), etc.) for monitor the performance of applications executing in a network and the network itself. In some embodiments, the application and network analytics platform 100 may implement the API endpoints 144 using Hadoop® Hive from Apache® for the back end, and Java® Database Connectivity (JDBC) from Oracle® Corporation of Redwood Shores, Calif., as an API layer. Hive is a data warehouse infrastructure that provides data summarization and ad hoc querying. Hive provides a mechanism to query data using a variation of structured query language (SQL) called HiveQL. JDBC is an application programming interface (API) for the programming language Java®, which defines how a client may access a database.

In some embodiments, the application and network analytics platform 100 may implement the event-based notification system using Hadoop® Kafka. Kafka is a distributed messaging system that supports partitioning and replication. Kafka uses the concept of topics. Topics are feeds of messages in specific categories. In some embodiments, Kafka can take raw packet captures and telemetry information as input, and output messages to a security information and event management (SIEM) platform that provides users with the capability to search, monitor, and analyze machine-generated data.

In some embodiments, each server in the network may include a software sensor and each network device may include a hardware sensor 114. In other embodiments, the software sensors 112 and hardware sensors 114 can reside on a portion of the servers and network devices of the network. In some embodiments, the software sensors 112 and/or hardware sensors 114 may operate in a full-visibility mode in which the sensors collect telemetry from every packet and every flow or a limited-visibility mode in which the sensors provide only the conversation view required for application insight and policy generation.

Figure 4:
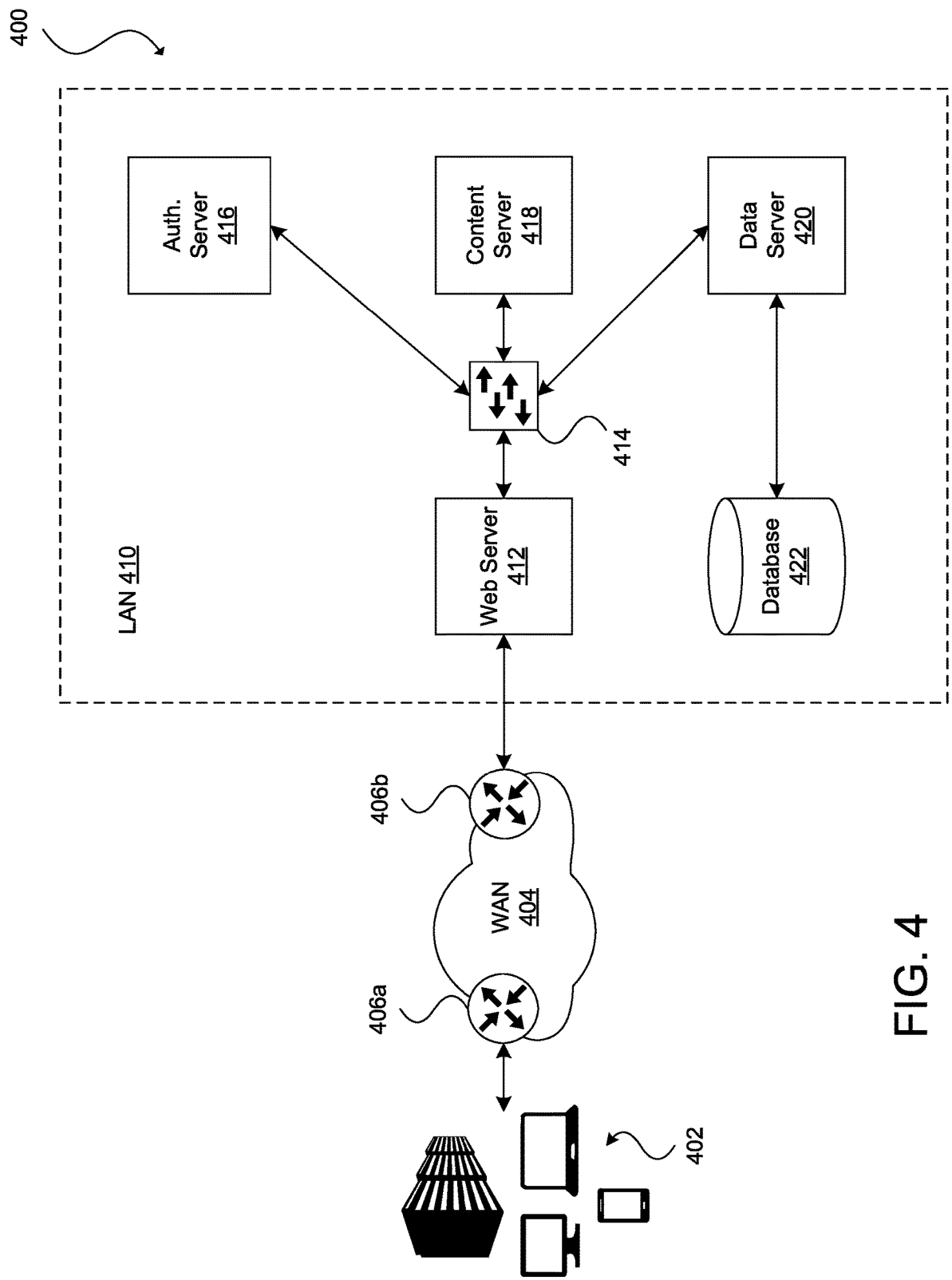
FIG. 4 illustrates an example of a network environment in accordance with an embodiment.

FIG. 4 illustrates an example of a network environment 400. One of ordinary skill will appreciate that, for the network environment 400 and any environment discussed in this disclosure, there can be additional or fewer nodes, devices, links, networks, or components in similar or alternative configurations. Other embodiments may have different numbers and/or types of clients, networks, nodes, cloud components, servers, software components, devices, virtual or physical resources, configurations, topologies, services, appliances, deployments, or network devices. Further, the network environment 400 can include any number or type of resources accessible and utilized by clients or tenants.

The network environment 400 can include a client computing device 402, a wide area network (WAN) 404, and a local area network (LAN) 410. Although not shown here for purposes of simplicity and conciseness, a typical data center may also include a firewall, a load balancer, and/or an additional edge router between an edge network device 406b and the web server 412. The client 402 can be any kind of computing device (i.e., of varying types, capabilities, operating systems, etc.) capable of communication over a network, such as a server (physical or virtual), a desktop computer, a laptop, a tablet, a smartphone, or a wearable device (e.g., a watch; eyeglasses, a visor, a head-mounted display or other device generally worn over a user's eyes; headphones, ear buds, or other device generally worn in or over a user's ears; etc.). The client 402 can also be an "infotainment system" (i.e., a computing device integrated with a means of transportation), a "smart" home device or Internet of Things (IoT) device (e.g., a television, a set-top box, a digital video recorder (DVR), a digital video disc (DVD) player or other media player, a video game console, etc.), or other electronic devices.

The WAN 404 can include one or more networks and/or network devices, such as the network devices 406a and 406b, for interconnecting the client 402 and the LAN 410. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and servers. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. The WAN 404 can also be a private network, such as a global enterprise network, that operates using similar or the same technologies as the public Internet.

LANs can connect nodes over dedicated private communications links located in the same general physical location, such as a building or campus. In the example of FIG. 4, the LAN 410 can be a data center that includes a single, simple web application. A typical data center can include hundreds or thousands of simpler or more complex applications. The web application includes a web server 412 connected to a network device 414 (e.g., a hub, switch, router, etc.) for communicating with an authentication server 416, a content server 418, and a data server 420. The data server 420 can directly or indirectly connect to a database 422. Although FIG. 4 may appear to show that the web server 412, the authentication server 416, the content server 418, and the data server 420 as separate elements, the servers or various combinations of the servers can reside on a single physical machine as virtual machines, containers, or other virtual entities. Similarly, the network device 414 can be one or more physical network devices, virtual network devices, or various combinations of physical and virtual network devices in a variety of configurations (e.g., leaf-spine, three-tier (i.e., including core, aggregation, and access levels), fat tree, mesh, bus, hub and spoke, etc.).

In the example of FIG. 4, the web application can be a simple website associated with one or more user accounts. Users may login to their accounts and access their personal information and other content. A user may access her account associated with the website/web application from the client device 402 (e.g., via a standalone client application, web browser, plug-in, etc.). The client device 402 may communicate with the website/web application located in the LAN 410 over the WAN 404 (e.g., the Internet, an enterprise network, etc.) for the user to interact with her account in any number of ways, such as updating privileged information (e.g., name, email address, login password, etc.), viewing content, creating content, etc. Each interaction can constitute a request to the website/web application and the results of the request may be a response. However, each request may comprise one or more additional sub-requests and sub-responses. Likewise, each response can include one or more sub-requests and sub-responses. The number of sub-requests and sub-responses can largely depend on the complexity of the application. But even a simple web application/website such as illustrated in FIG. 4 can include numerous sub-requests and sub-responses.

Figure 5:
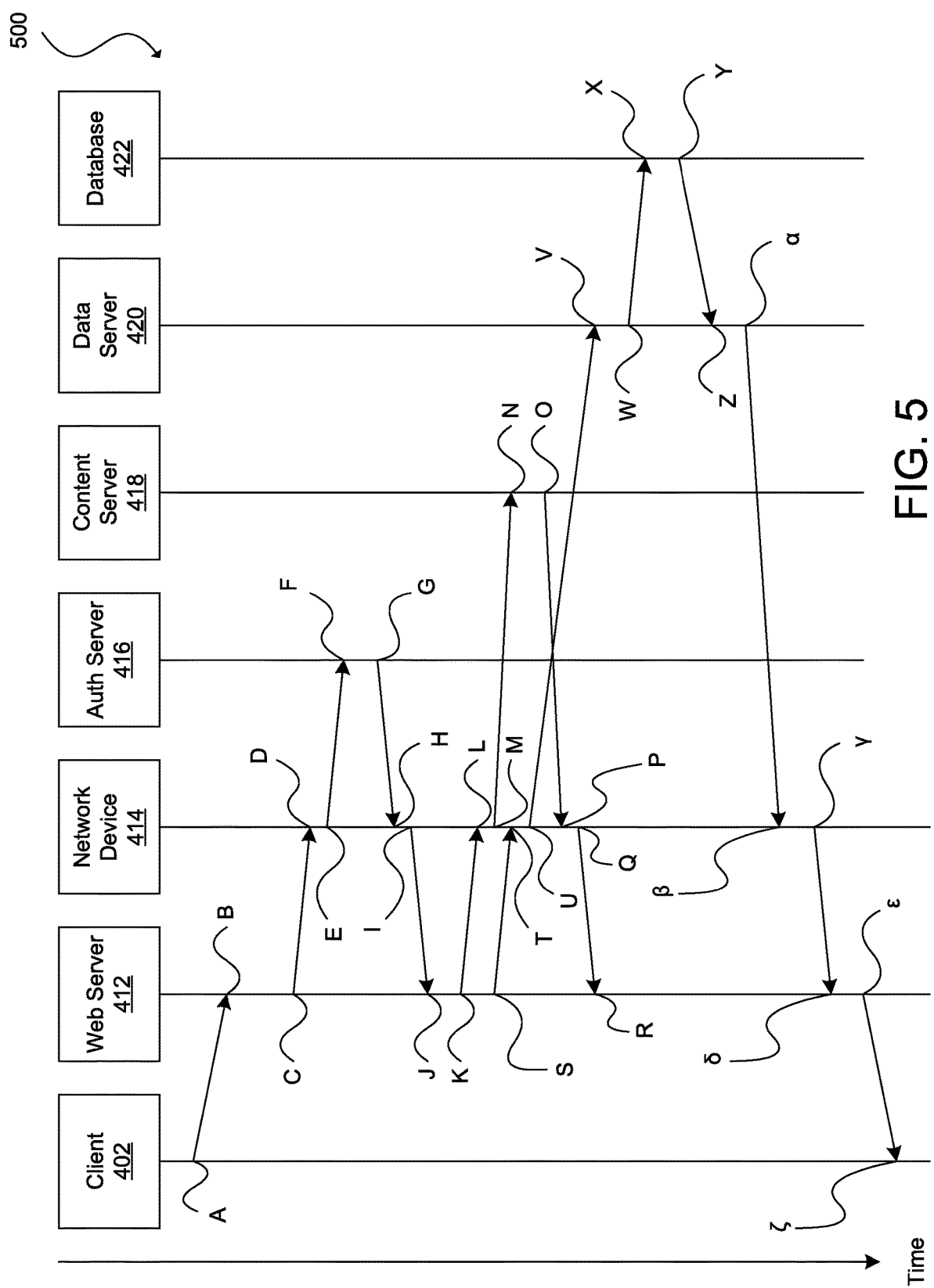
FIG. 5 illustrates an example of a request and response sequence in accordance with an embodiment.

FIG. 5 illustrates an example of a time sequence 500 of a request and response for an interaction with the website/web application of FIG. 4. One of ordinary skill will understood that, for any sequence discussed herein, there can be additional, fewer, or alternative steps performed in similar or alternative orders, or in parallel, within the scope of the various embodiments unless otherwise stated. The user interaction may be a user logging into the website/web application, clicking to view certain content, searching for content in the website/web application, among any number of possibilities. In the time sequence 500, the vertical axis corresponds to time and the horizontal axis shows the communications between the various components of the website/web application.

In the example of FIG. 5, the client 402 may send an originating request (i.e., at point A) for a particular page of the website/web application or other content. After traversing the WAN 404, the originating request may arrive at the web server 412 after a duration AB. As discussed above, the originating request may include segments through the WAN 404, one or more of the data center's edge network devices, firewalls, load balancers, among other software and hardware components but FIG. 5 excludes those segments for brevity and clarity. The web server 412 may spend some time BC processing the request to determine that the request is a request for personal content requiring authentication. Thus, the web server 412 may send an authentication request (i.e., at point C) to the authentication server 416 to verify the user's login name and password match the user's information stored by the website/web application. To send the authentication request, the web server 412 may first forward the authentication request to the network device 414 for a duration CD. The network device 414 can receive the authentication request, take some amount of time DE to process the packets of the authentication request and forward the request to the authentication server 416 for a duration EF. The authentication server 416 may process the authentication request and prepare an authentication response (i.e., at point G) for a time FG and forward the authentication request to the network device 414 for a time GH. The network device 414 can spend a time HI to determine where to forward the authentication request to the web server 412 upon which the network device 414 may forward the response to the web server 412 over a duration IJ.

The web server 412 may confirm authentication of the user from the authentication response and begin retrieving content to provide a response to the originating request. The response may be a page of the website/web application that includes content from the content server 418 and personal information from the data server 420. The web server 412 may take up a time JK to prepare the request to the content server 418 and a time KS to prepare the request to the data server 420. The web server 412 may send the content request to the network device 414 over a time KL, upon which the network device 414 may spend a time LM to forward the request to the content server 418 for a duration MN. The content server 418 can receive the content request, take a time NO to process the request, and transmit a content response to the network device 414 over a time OP. The network device 414 can process the content response for a time PQ and forward the content response to the web server after which a time QR elapses.

In parallel or very near in time to the request/response to the content server 418, the web server 412 may send the data request to the network device 414 for a time ST. The network device can process the data request for a time TU and forward the data request over a period of time UV. The data server 420 may have an architecture such that it must retrieve requested data from the database 422, and therefore must perform some time VW processing the data request and preparing a database request (i.e., at point W). The database request may take a time WX to arrive at the database 422. Fetching the requested data may occur over a duration XY and transmitting the data (i.e., at point Y) back to the data server 420 may occur over a time YZ. The data server may process the database response within a time $Z\alpha$ before sending a data response back to the network device 414 over a time $\alpha\beta$. The network device may process the data response for a time $\beta\gamma$ and forward the data response over a time $\gamma\delta$. The web server 412 may assemble the content retrieved from the content server 418 and the data retrieved from the data server 420 over a time $\delta\epsilon$ before sending the response to the originating request to the client 402 over a time $\epsilon\zeta$.

In the example of FIG. 5, the segments beginning from BC through $\epsilon\zeta$ can represent the total latency for sending the web server response to the originating request to the web server. The total response latency can thus include latency due to the web server 412, latency due to the authentication server 416, and the maximum between the latency due to the content server 418 and the latency due to the data server 420 (assuming parallel or substantially parallel requests to the content server 418 and the data server 420). Some conventional data centers may be able to derive some of these latencies. For example, a data center relying on network telemetry from network devices (e.g., the network device 414 may be able to calculate the web server latency via the timestamps of the authentication request flowlet and the authentication response flowlet. Likewise, it may be possible for data centers that rely on telemetry from servers to compute the web server latency from web server logs indicating when the web server 412 sent the authentication request flowlet to the authentication server 416 and when the web server received the authentication response flowlet from the authentication server 416. Various embodiments can improve upon these conventional approaches by computing more granular latencies. For example, the application and network analytics platform 100 can resolve the total latency for providing the response to the authentication request to include the segment CD representing network latency from the web server 412 to the network device 414, the segment DE representing network device latency (although negligible and ignored in some embodiments), the segment EF representing network latency from the network device 414 to the authentication server 416, the segment FG represent authentication server latency, the segment GH representing network latency from the authentication server 416 to the network device 414, the segment HI representing network device latency, and the segment IJ representing the network latency from the network device 414 to the web server 412. The conventional data centers could not determine latency at this level of granularity but various embodiments of the present technology can by obtaining telemetry from the web server 412, the network device 414, and the authentication server 416. Over a period of time, an application and analytics framework in accordance with some embodiments may establish baseline metrics for the network latency between the web server 412 and the authentication server 416 (i.e., segments CD, (sometimes DE), EF), authentication server latency (i.e., segment FG), and the network latency between the authentication server 416 and the web server 412 (i.e., segments GH, (sometimes HI), and IJ). When users experience latency, an administrator may determine quickly whether the issue is due to server latency or network latency based on this manner of decomposing flows into flowlets.

As shown in FIG. 5, a single user interaction with a simple application can comprise more than a dozen requests and responses. A typical enterprise network can include hundreds or thousands of much more complex applications with hundreds or thousands of users possibly performing millions or billions of operations per day. It would not be possible for a human user to process and analyze this volume of data. FIG. 5 also demonstrates the incompleteness of data centers that only rely on telemetry from one of servers or network devices. For example, in a first data center in which telemetry is only available from the network device 414 and in a situation where the network device's attempt to communicate with the data server 420 is unusually slow or fails, the first APM platform could not diagnose whether the issue arises due to application unavailability or load. In addition, the first data center may not be able to provide insight as to whether the problem lays in the data server 420, the database 422, or the connection between the data server and the database. For instance, in the data request, the first data center may only recover ST and UV but may not be capable of recovering VW, WX, XY, YZ, and Z$\alpha$ because the first data center may not be aware that the data server 320 has a dependency on the database 322.

A second data center that relies only on telemetry from servers may also suffer from various defects. Such a system may be able to detect anomalous (or no) response times in communications between the web server 412 and the data server 420 but may not be able to ascertain whether latency or failure is due to the web server 412, the network device 414, the data server 420, the database 422, or the connection between the data server and the database. For example, in the data request, the second data center may have a view of the data request and the data response but ST, TU, UV, VW, WX, XY, YZ, Zα, αβ, βγ, and γδ may be a black box. Various embodiments may overcome these and other deficiencies with prior art data center by capturing telemetry along multiple points of a data path, resolving flows into flowlets, establishing baselines for the flowlets, and evaluating new traffic against the baselines to more precisely diagnose the root cause of application and network performance degradation.

Figure 6:
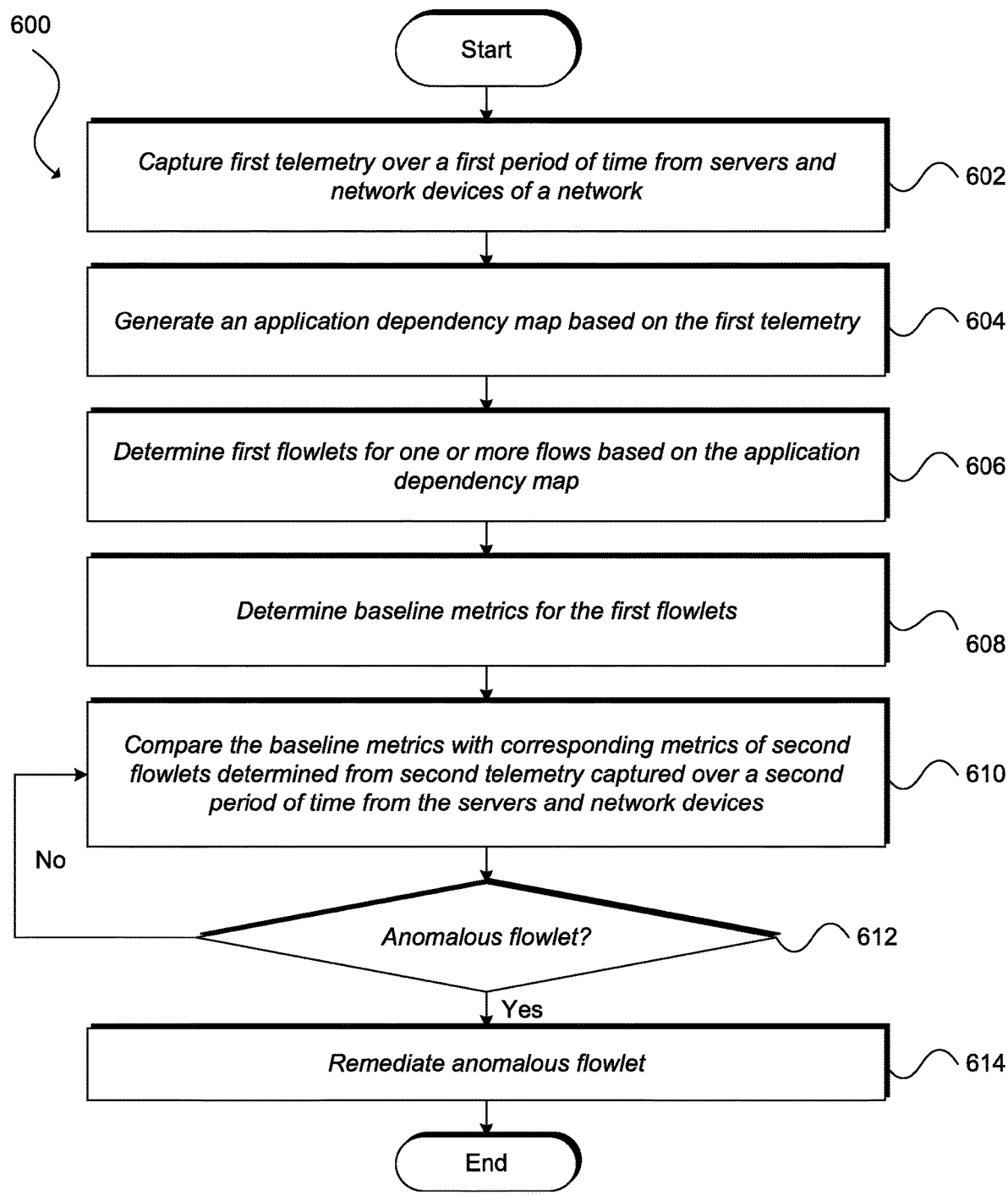
FIG. 6 illustrates an example method for resolving a flow into flowlets for application performance monitoring and management in accordance with an embodiment.

FIG. 6 illustrates an example of a method 600 for resolving one or more flows into flowlets for application performance monitoring and management. One of ordinary skill will understood that, for any method discussed herein, there can be additional, fewer, or alternative steps performed in similar or alternative orders, or in parallel, within the scope of the various embodiments unless otherwise stated. A network, and particularly, an application and network analytics platform (e.g., the application and network analytics platform 100 of FIG. 1), an analytics engine (e.g., the analytics engine 120 of FIG. 1), an APM engine (e.g., the APM engine 130 of FIG. 1), a network operating system, a virtual entity manager, or similar system can perform the method 600.

In the example of FIG. 6, the method 600 may begin at step 602 in which sensors (e.g., the software sensors 112 and hardware sensors 114 of FIG. 1) capture telemetry from servers and network devices of the network (e.g., flow data, host data, process data, user data, policy data, etc.) over a first period of time to establish a baseline for application and network performance. In some embodiments, the application and network analytics platform may also collect virtualization information, network topology information, and application information (e.g., configuration information, previously generated application dependency maps, application policies, etc.). In addition, the application and network analytics platform may also collect out-of-band data (e.g., power level, temperature, and physical location) and customer/third party data (e.g., CMDB or CMS as a service, Whois, geocoordinates, etc.). As discussed, the software sensors 112 and hardware sensors 114 can collect the captured data from multiple perspectives to provide a comprehensive view of network behavior. The software sensors 112 may include sensors along multiple points of a data path (e.g., network devices, physical or bare metals servers) and within multiple partitions of a physical host (e.g., hypervisor, container orchestrator, virtual entity manager, VM, container, other virtual entity, etc.).

After collection of the network telemetry and associated data, the method 600 may continue on to step 604, in which the application and network analytics platform can generate an application dependency map (ADM) for one or more applications executing in the network. In some embodiments, the nodes of the ADM can represent a pairing or concatenation of a server and a process (or application tier, application, application component, or other application granularity in other embodiments), and the edges of the ADM graph can represent the application and network analytics framework detecting flows between nodes. Clusters of nodes (i.e., host-process pairings within a similarity threshold of one another) can represent application components and each connected graph of the ADM can represent an application.

In some embodiments, generating the ADM can involve determining the nodes of the ADM by concatenating servers (e.g., the telemetry identifies a server as a source or destination in packet header metadata of a packet/flow) and applications/application components (e.g., the telemetry identifies a process generating a packet/flow). Generating the ADM can also include determining edges of the ADM by detecting one or more flows between nodes of the ADM. Generating the ADM can further include determining feature vectors for the nodes. The feature vector for each node may include a concatenation of server features, process features, and/or other features. The server features can include the server name, network address, operating system, CPU usage, network usage, disk space, ports, logged users, scheduled jobs, open files, and information regarding files and/or directories stored on the server. The process features can include the process name, process identifier, parent process identifier, process path, CPU utilization, memory utilization, memory address, scheduling information, nice value, flags, priority, status, start time, terminal type, CPU time taken by the process, the command string that started the process, and the process owner (e.g., user name, user identifier, user's real name, e-mail address, user's groups, terminal information, login time, expiration date of login, idle time, and information regarding files and/or directories of the user. In some embodiments, the feature vectors can also include features extracted from customer/third party data such as and customer/third party data (e.g., CMDB or CMS as a service, Whois, geocoordinates, etc.)

Telemetry used to detect flows between the nodes of the ADM may include packet header fields such as source address, source port, destination address, destination port, protocol type, class of service, etc. and/or aggregate packet data such as flow start time, flow end time, number of packets for a flow, number of bytes for a flow, the union of TCP flags for a flow, etc.

Generating the ADM can also involve determining similarity between the nodes of the ADM by comparing their feature vectors. Similarity can be a measure of how much alike two nodes are relative to other nodes, or a measure of two nodes being less distant to one another than other nodes. In some embodiments, the application and network analytics platform can use as similarity/distance measures one or more of Euclidean distance, Manhattan distance, Minkowski distance, cosine similarity, Jaccard similarity, and the like. In some embodiments, determining the ADM can further include setting the similarity threshold for clusters to specify a level of granularity with respect to a view of the applications executing in the network. For example, setting the similarity threshold to a very coarse degree of similarity can result in a single cluster representing the data center as a monolithic application. On the other hand, setting the similarity threshold to a very fine degree of similarity can result in singleton clusters for each host-process pairing in the network. Setting the similarity threshold can depend largely on the number and types of applications executing in the network and the level of granularity desired for the task at hand. In most situations, the similarity threshold may lie somewhere between very coarse and very fine. As discussed, clusters can represent application components, and a connected graph can represent an application.

After generating the ADM, the method 600 can proceed to step 606 in which the application and network analytics platform may devolve flows into one or more flowlets. That is, the application and network analytics platform can break a flow down into a series of sub-requests and sub-responses by tracing a flow from source to destination. A request flow can include hops over network devices from source to destination and processing of the flow by the network devices. A response flow can include hops over network devices, processing of the flow by the network devices, and sub-requests and sub-responses to intermediate endpoints (including hops over network devices and processing by these network devices) performed to generate a response to the originating request flow. For example, in FIG. 5, the application and network analytics platform may decompose the response of the web server 412 to the originating request from the client as a sequence including the segments BC, CD, DE, EF, FG, GH, HI, IJ, JK, KL, LM, MN, NO, OP, PQ, QR, ST, TU, UV, WX, XY, YZ, Zα, αβ, βγ, γδ, δε, and εζ.

The method 600 may continue to step 608 in which the application and network analytics platform can determine baseline metrics for the flowlets such as an average or a range of the length of time for transmitting and/or processing each flowlet and/or an average amount of data or a range of the amount of data (e.g., in number of packets and/or bytes) transmitted and/or processed within each flowlet. For example, the application and network analytics platform can detect a request flow associated with an application executing on a server using network telemetry and associated data captured by a software sensor of the server, such as by taking a snapshot of the processes executing on the server around or at the time that the server generated the flow and correlating the flow with one of the processes. The application and network analytics platform can trace the request flow from the server to one or more network devices (i.e., the network devices may correspond to one or more hops of the flow) and determine the transmission time(s) (and sometimes the amounts of data transmitted) between the server and the network device(s) as well as the time spent by the network device(s) to process the flow based on network telemetry captured by the hardware sensor(s) of the network device(s). The application and network analytics platform can trace the response flow as the transmission and/or processing of sub-requests and sub-responses to other servers (and transmission and/or processing by network devices along the data paths of the sub-requests and responses) based on network telemetry and associated data captured by the sensors of these additional devices and determine the amount of times (and/or the amount of data in some embodiments) associated with transmitting and/or processing the sub-requests and sub-responses. The application and network analytics platform can determine a baseline metric for a flowlet by aggregating observations of the flowlet detected during a specified period of time.

At step 610, the application and network analytics platform can evaluate network telemetry and associated data over a second period of time by comparing new flowlets against their corresponding baselines. In some embodiments, the application and network analytics platform may use machine learning and pattern recognition algorithms to classify each new flowlet. Machine learning can involve receiving "trained" samples (i.e., flowlets associated with predetermined classifications), determining the features (sometimes weighted) that the samples of a particular classification may have in common with one another and may not have in common with other classifications, and using these (sometimes weighted) features to classify new flowlets. Machine-learning and pattern recognition algorithms can include decision trees, random forests, rules-based classifiers, support vector machine (SVM) classifiers, neural network classifiers, nearest neighbor classifiers, etc.

Decision trees use a hierarchical division of the underlying data and different features. The hierarchical division of the data creates class partitions skewed in terms of their class distribution. For a given set of differences between flowlets, the partition that a flowlet is most likely to belong to is that flowlet's classification.

Random forests rely on a combination of decision trees in which each tree depends on the values of a random vector sampled independently and with the same distribution for all trees in the forest. Implementers can train a random forest for a number of trees T by sampling n cases of the training data at random with replacement to create a subset of the training data. At each node, the classifier can select a number m of the features at random from the set of all features, and can ultimately select the feature that provides the best split to do a binary split on that node. At the next node, the classifier selects another number m of the features at random and repeats the process.

Rules-based classifiers determine patterns (e.g., regular expressions) that define the different classes. These types of classifiers define a set of rules in which the left-hand side corresponds to a pattern, and the right-hand side corresponds to a class label. The rules determine the classification.

SVM classifiers attempt to partition the underlying data using linear or non-linear delineations between the different classes. The premise of these classifiers is to determine the optimal boundaries between the different classes and use these boundaries for the purposes of classification.

Neural network classifiers utilize an interconnected group of functions or classifiers that process information using a connectionist approach. Neural networks change their structure during training, such as by merging overlapping detections within one network and training an arbitration network to combine the results from different networks.

Nearest neighbor classifiers determine the k-nearest neighbors in the training data to a specific set of differences between flowlets, and the majority class from the k neighbors determines the classification.

At decision point 612, if the new flowlets do not deviate from their baselines, such as by occurring within a specified time range and/or transmitting/processing an amount of data within a specified range of data sizes, then the application and network analytics platform may continue analyzing new flowlets.

However, if the application and network analytics platform determines that the new flowlets deviate from their baselines, at step 614, the application and network analytics platform can perform certain remediation tasks to address the deviations. In some embodiments, remediation can include generating an alert, such as via an event-based notification system (e.g., the event-based notification system 146 of FIG. 1). In some cases, a network administrator may analyze the anomalous flowlet and determine that performance of the application and network is in line with expectation or determine that the flowlet is indicative of an issue with application and network performance. The application and network analytics platform can receive this as input (i.e., a trained sample) to improve machine learning.

As discussed, in some embodiments, the application and network analytics platform can determine the physical and/or logical locations of servers within the network (e.g., CMDB/CMS, geocoordinates, IP address, etc.). The application and network analytics can use the location information to determine optimal placement and configuration of application components that are dependent on one another such that the components are closer together physically and/or logically. For example, the application and network analytics platform may determine that an anomalous flow is a bottleneck for a particular application and can locate a different location for the application component. As another example, the application and network analytics platform may have a comprehensive view of the application and network activity in the data center and can determine locations for application components that minimize bandwidth and latency. Thus, in some embodiments, remediation can include automatically migrating virtual entities having application dependencies closer together physically and/or logically to resolve application and network performance issues. In some embodiments, remediation can also include generating recommendations on physical placement or configuration of application components to be physically and/or logically closer together to reduce latency and other performance degradation.

Figure 7A:
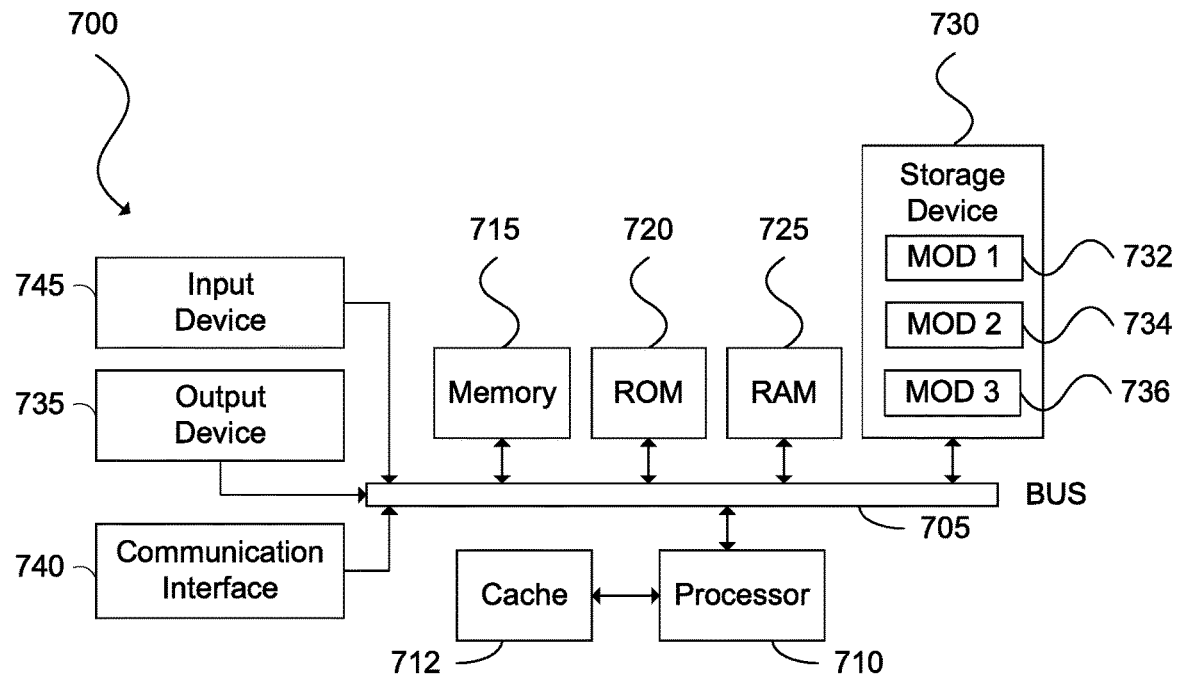
FIG. 7A and FIG. 7B illustrate examples of systems in accordance with some embodiments.
Figure 7B:
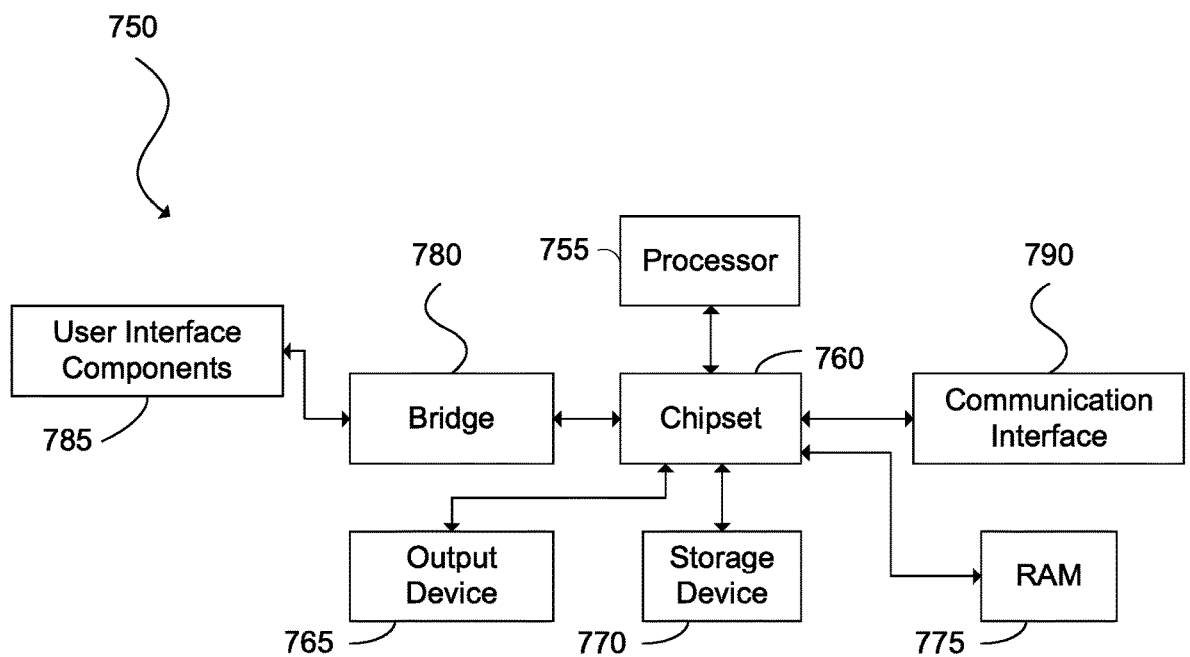

FIG. 7A and FIG. 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example architecture for a conventional bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) in a storage device 770 and random access memory (RAM) 775, to the processor 710. The computing system 700 can include a cache 712 of high-speed memory connected directly with, in close proximity to, or integrated as part of the processor 710. The computing system 700 can copy data from the memory 715 and/or the storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and various other embodiments may substitute the basic features here for improved hardware or firmware arrangements.

Storage device 730 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Various embodiments may utilize other hardware or software modules. The storage device 730 can connect to the system bus 705. In one aspect, a hardware module that performs a particular function can include the software component stored in a computer-readable medium in connection with the necessary hardware components, such as the processor 710, bus 705, output device 735, and so forth, to carry out the function.

FIG. 7B illustrates an example architecture for a conventional chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, and solid state media, for example. The chipset 760 can also read data from and write data to RAM 775. A bridge 780 for connecting a variety of user interface components 785 can interface with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 755 analyzing data stored in the storage device 770 or the RAM 775. Further, the computing system 700 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rack mount devices, standalone devices, and so on. Other embodiments may implement the functionality described in this disclosure in peripherals or add-in cards. Various embodiments may also implement this functionality on a circuit board among different chips or different processes executing in a single device, by way of further example.

The instructions, media for conveying such instructions, computing resources for executing them, and other structures for supporting such computing resources are means for providing the functions described in these disclosures.

Although the disclosure uses a variety of examples and other information to explain aspects within the scope of the appended claims, a person having ordinary skill in art will understand not to limit the claims to particular features or arrangements in such examples, as one of ordinary skill can use these examples to derive a wide variety of implementations. Further, although the disclosure describes some subject matter in language specific to examples of structural features and/or method steps, one of ordinary skill will understand that the subject matter defined in the appended claims is not necessarily limited to these described features or acts. For example, such functionality can be distributed differently or performed in components other than those identified herein. Rather, the disclosure provides described features and steps as examples of components of systems and methods within the scope of the appended claims.

The invention claimed is:

1. A method comprising:
capturing first telemetry over a first period of time from at least a first server and a first network device of a network;
determining a plurality of nodes of an application dependency map associated with the first telemetry by concatenating server features and process features;
determining a plurality of edges of the application dependency map based on the first telemetry comprising flow information indicative of one or more flows between pairs of nodes of the plurality of nodes;
determining a first feature vector for a first node of the plurality of nodes;
determining a cluster comprising the first node and a second node of the plurality of nodes in the application dependency map based on a similarity metric between the first feature vector and a second feature vector of the second node satisfying a similarity threshold;
determining, based on the application dependency map, a first plurality of flowlets for at least one flow generated by the first server and comprising the first network device as a hop;
determining a baseline metric for at least one first flowlet of the first plurality of flowlets;
determining at least one anomalous flowlet by comparing the baseline metric to a corresponding metric of at least one second flowlet associated with second telemetry captured over a second period of time from at least the first server and the first network device;
determining that the at least one anomalous flowlet was processed by both the first server and a second server of the network; and
migrating, based on the determining that the at least one anomalous flowlet was processed by both the first server and the second server, the first server from a first location to a second location, wherein the migrating reduces a distance between the first server and a third location of the second server of the network associated with the at least one anomalous flowlet, the second location being different than the third location.

2. The method of claim 1, further comprising:
determining the similarity threshold for generating a plurality of clusters.

3. The method of claim 1, further comprising:
executing a machine learning process to determine the similarity metric.

4. The method of claim 3, further comprising:
receiving a classification for the at least one anomalous flowlet; and
updating the machine learning process using the classification.

5. The method of claim 1, further comprising:
determining a first flowlet of the first plurality of flowlets by tracing the at least one flow from the first server to the first network device.

6. The method of claim 1, further comprising:
determining a first flowlet of the first plurality of flowlets by tracing one or more sub-requests and sub-responses to one or more second servers of the network.

7. The method of claim 1, further comprising:
determining the baseline metric as a sum including a time for transmitting the at least one first flowlet to the first network device and a processing time of the at least one first flowlet by the first network device.

8. The method of claim 1, further comprising:
determining the baseline metric as at least one of a time for the first server to generate at least one sub-request to a second server of the network, a time for transmitting the at least one sub-request from the first server to the second server, a time for processing the at least one sub-request by the second server, a time for generating a sub-response by the second server, or a time for transmitting the at least one sub-response from the second server to the first server.

9. A system comprising:
one or more processors; and
memory including instructions that, upon being executed by the one or more processors, cause the system to:

capture first telemetry over a first period of time from at least a first server and a first network device of a network;

determine a plurality of nodes of an application dependency map associated with the first telemetry by concatenating server features and process features;

determine a plurality of edges of the application dependency map based on the first telemetry comprising flow information indicative of one or more flows between pairs of nodes of the plurality of nodes;

determine a first feature vector for a first node of the plurality of nodes;

determine a cluster comprising the first node and a second node of the plurality of nodes in the application dependency map based on a similarity metric between the first feature vector and a second feature vector of the second node satisfying a similarity threshold;

determine, based on the application dependency map, a first plurality of flowlets for at least one flow generated by the first server and including the first network device as a hop;

determine a baseline metric for at least one first flowlet of the first plurality of flowlets;

determine at least one anomalous flowlet by comparing the baseline metric to a corresponding metric of at least one second flowlet associated with second telemetry captured over a second period of time from at least the first server and the first network device;

determine that the at least one anomalous flowlet was processed by both the first server and a second server; and migrate, based on determining that the at least one anomalous flowlet was processed by both the first server and the second server, the first server from a first location to a second location, wherein the migrating reduces a distance between the first server and a third location of the second server of the network associated with the at least one anomalous flowlet, the second location being different than the third location.

10. The system of claim 9, wherein the instructions upon being executed further cause the system to:
capture at least a portion of the first telemetry at line rate from a hardware sensor embedded in an application-specific integrated circuit (ASIC) of the first network device.

11. The system of claim 9, wherein the instructions upon being executed further cause the system to:
capture at least a portion of the first telemetry from a software sensor residing within a bare metal server of the network.

12. The system of claim 9, wherein the instructions upon being executed further cause the system to:
capture at least a portion of the first telemetry from a plurality of software sensors residing within a plurality of virtual entities of a same physical server of the network.

13. A non-transitory computer-readable medium having instructions that, upon being executed by one or more processors, cause the one or more processors to:

capture first telemetry over a first period of time from at least a first server and a first network device of a network;

determine a plurality of nodes of an application dependency map associated with the first telemetry by concatenating server features and process features;

determine a plurality of edges of the application dependency map based on the first telemetry comprising flow information indicative of one or more flows between pairs of nodes of the plurality of nodes;

determine a first feature vector for a first node of the plurality of nodes;

determine a cluster comprising the first node and a second node of the plurality of nodes in the application dependency map based on a similarity metric between the first feature vector and a second feature vector of the second node satisfying a similarity threshold;

determine, based on the application dependency map, a first plurality of flowlets for at least one flow generated by the first server and including the first network device as a hop;

determine a baseline metric for at least one first flowlet of the first plurality of flowlets;

determine at least one anomalous flowlet by comparing the baseline metric to a corresponding metric of at least one second flowlet associated with second telemetry captured over a second period of time from at least the first server and the first network device;

determine that the at least one anomalous flowlet was processed by both the first server and a second server; and migrate, based on determining that the at least one anomalous flowlet processed by both the first server and the second server, the first server from a first location to a second location, wherein the migrating reduces a distance between the first server and a third location of the second server of the network associated with the at least one anomalous flowlet, the second location being different than the third location.

14. The non-transitory computer-readable medium of claim 13, wherein the instructions further cause the one or more processors to:
execute a machine learning process to determine the similarity metric;
receive a classification for the at least one anomalous flowlet; and
update the machine learning process using the classification.

15. The non-transitory computer-readable medium of claim 13, wherein the instructions further cause the one or more processors to:
determine a first flowlet of the first plurality of flowlets by tracing the at least one flow from the first server to the first network device; and
determine a second flowlet of the first plurality of flowlets by tracing one or more sub-requests and sub-responses to one or more second servers of the network.

* * * * *